(12) United States Patent
Endo et al.

(10) Patent No.: US 9,242,670 B2
(45) Date of Patent: Jan. 26, 2016

(54) POWER STEERING CONTROLLER WITH COMPENSATION FOR TIRE DEFORMATION AND CASTER

(75) Inventors: Masaya Endo, Chiyoda-ku (JP);
Masahiko Kurishige, Chiyoda-ku (JP);
Takayuki Kifuku, Chiyoda-ku (JP);
Masaki Matsushita, Chiyoda-ku (JP);
Hideki Doi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 128 days.

(21) Appl. No.: 13/574,047

(22) PCT Filed: Feb. 19, 2010

(86) PCT No.: PCT/JP2010/052527
§ 371 (c)(1),
(2), (4) Date: Jul. 19, 2012

(87) PCT Pub. No.: WO2011/101979
PCT Pub. Date: Aug. 25, 2011

(65) Prior Publication Data
US 2012/0296525 A1  Nov. 22, 2012

(51) Int. Cl.
*B62D 5/04* (2006.01)
*B62D 6/04* (2006.01)
*B62D 6/00* (2006.01)

(52) U.S. Cl.
CPC .............. *B62D 6/008* (2013.01); *B62D 5/0466* (2013.01); *B62D 5/0463* (2013.01); *B62D 6/04* (2013.01)

(58) Field of Classification Search
CPC .................................. B62D 5/0466; B62D 6/008
See application file for complete search history.

(56) References Cited

U.S. PATENT DOCUMENTS

| | | | |
|---|---|---|---|
| 4,946,001 A | 8/1990 | Taniguchi et al. | |
| 6,134,490 A * | 10/2000 | Ito et al. | 701/42 |
| 6,925,371 B2 * | 8/2005 | Yasui et al. | 701/72 |
| 7,275,617 B2 * | 10/2007 | Endo et al. | 180/402 |
| 7,502,676 B2 * | 3/2009 | Ono et al. | 701/41 |
| 7,810,608 B2 * | 10/2010 | Goto et al. | 180/446 |
| 7,918,306 B2 * | 4/2011 | Tamaizumi | 180/446 |
| 8,078,361 B2 | 12/2011 | Galkowski et al. | |

(Continued)

FOREIGN PATENT DOCUMENTS

JP 1-278881 A 11/1989
JP 8-85469 A 4/1996

(Continued)

OTHER PUBLICATIONS

Gualino et al., "Force-Feedback System Design for the Steer-by-Wire: Optimisation and Performance Evaluation", Proceedings of the IEEE Intelligent Transportation Systems Conference, Sep. 2006, pp. 181-187.*

(Continued)

*Primary Examiner* — Todd Melton
(74) *Attorney, Agent, or Firm* — Sughrue Mion, PLLC

(57) ABSTRACT

In a steering control device, a road surface reaction force torque calculation module (52) uses a vehicle speed, steering angle, and vehicle model to calculate a caster-trail-caused torque, a self-aligning torque, and a road surface reaction force torque. A reaction force command current calculation module (53) uses the road surface reaction force torque and the vehicle speed to calculate a reaction force command current.

12 Claims, 22 Drawing Sheets

(56) References Cited

U.S. PATENT DOCUMENTS

| | | | |
|---|---|---|---|
| 8,200,392 B2 * | 6/2012 | Kodaira et al. | 701/41 |
| 8,209,089 B2 * | 6/2012 | Tanaka et al. | 701/41 |
| 8,219,285 B2 * | 7/2012 | Watanabe et al. | 701/42 |
| 8,306,702 B2 * | 11/2012 | Suzuki et al. | 701/42 |
| 2002/0005314 A1 | 1/2002 | Takehara et al. | |
| 2006/0074541 A1 | 4/2006 | Ono et al. | |
| 2007/0227806 A1 * | 10/2007 | Wei | 180/446 |
| 2009/0271069 A1 * | 10/2009 | Yamamoto et al. | 701/41 |
| 2010/0108432 A1 * | 5/2010 | Okazaki et al. | 180/446 |

FOREIGN PATENT DOCUMENTS

| | | |
|---|---|---|
| JP | 2001-233231 A | 8/2001 |
| JP | 2002-087309 A | 3/2002 |
| JP | 2002-145100 A | 5/2002 |
| JP | 2003-127888 A | 5/2003 |
| JP | 2004-175280 A | 6/2004 |
| JP | 2004-338616 A | 12/2004 |
| JP | 2006-281880 A | 10/2006 |
| JP | 2007-513008 A | 5/2007 |
| JP | 2007-269251 A | 10/2007 |
| JP | 2007-314005 A | 12/2007 |
| JP | 2008-114687 A | 5/2008 |
| JP | 2008-149961 A | 7/2008 |

OTHER PUBLICATIONS

Kazuhiro Yubai et al., "Design Method of Electric Power Steering Control System Using Scheduled $H_{\infty}$ Control", T IEE Japan, 1999, pp. 83-90, vol. 119-c, No. 1.

Japanese Office Action, (Preliminary Notice of Reasons for Rejection) Jul. 9, 2013, Patent Application No. 2012-500431.

Chinese Office Action, 201080064248.4; Mar. 5, 2014.

* cited by examiner

FIG. 4

| SYMBOLS |
| --- |
| $\theta_h$ : STEERING ANGLE[rad] |
| $\delta$ : STEERED ANGLE OF STEERED WHEEL[rad] |
| $\beta$ : CHASSIS SIDESLIP ANGLE[rad] |
| $\gamma$ : YAW RATE[rad/s] |
| $\phi$ : ROLL ANGLE [rad] |
| $F_{yf}$ : FRONT WHEEL TIRE LATERAL FORCE[N] |
| $F_{yr}$ : REAR WHEEL TIRE LATERAL FORCE[N] |
| $M_R$ : ROAD SURFACE REACTION FORCE TORQUE[Nm] |
| $M_F$ : TORQUE GENERATED BY CASTER TRAIL AND TIRE LATERAL FORCE (CASTER-TRAIL-CAUSED TORQUE)[Nm] |
| $M_S$ : SELF-ALIGNING TORQUE[Nm] |
| $M_{s1}$ : TORQUE GENERATED BY UNEVEN DISTRIBUTION OF TIRE LATERAL FORCE ON STEERED WHEEL CONTACT SURFACE (PNEUMATIC-TRAIL-CAUSED TORQUE)[Nm] |
| $M_{s2}$ : TORQUE GENERATED BY TWIST OF TIRE ITSELF CONSTITUTING PART OF STEERED WHEEL BY ELASTIC DEFORM UPON GENERATION OF SIDESLIP ANGLE OF STEERED WHEEL (TWIST TORQUE OF TIRE)[Nm] |
| $m$ : VEHICLE WEIGHT[kg] |
| $L$ : WHEELBASE[m] |
| $L_f$ : DISTANCE FROM CENTER OF GRAVITY TO FRONT WHEEL[m] |
| $L_r$ : DISTANCE FROM CENTER OF GRAVITY TO REAR WHEEL[m] |
| $I_z$ : MOMENT OF INERTIA ABOUT z AXIS OF CHASSIS[kg m$^2$] |
| $K_f$ : FRONT WHEEL (ONE WHEEL) CORNERING POWER[N/rad] |
| $K_r$ : REAR WHEEL (ONE WHEEL) CORNERING POWER[N/rad] |
| $L_p$ : PNEUMATIC TRAIL[m] |
| $L_c$ : CASTER TRAIL[m] |
| $G_s$ : OVERALL STEERING GEAR RATIO[-] |
| $k_y$ : TIRE LATERAL STIFFNESS[N/m] |
| $m_s$ : SPRUNG MASS[kg] |
| $h_s$ : HEIGHT FROM ROLL CENTER TO CENTER OF GRAVITY[m] |
| $I_\phi$ : ROLL MOMENT OF INERTIA[kg m$^2$] |
| $I_{z\phi}$ : PRODUCT OF INERTIA[kg m$^2$] |
| $C_\phi$ : ROLL VISCOSITY COEFFICIENT[Nm/(rad/s)] |
| $K_\phi$ : ROLL STIFFNESS[Nm/rad] |
| $R_{sf}$ : FRONT ROLL STEERING COEFFICIENT[rad/rad] |
| $R_{sr}$ : REAR ROLL STEERING COEFFICIENT[rad/rad] |
| $k_z$ : TIRE TWIST STIFFNESS[Nm/rad] |
| $T_1$ : TIRE TWIST RESPONSE TIME CONSTANT[s] |
| $\lambda$ : INTERMEDIATE STATE VARIABLE[rad] |
| $L_t$ : TIRE TWIST RESPONSE DISTANCE[m] |
| $T_2$ : LOW-PASS FILTER TIME CONSTANT[s] |
| $V$ : VEHICLE SPEED[m/s] |

POWER STEERING CONTROLLER WITH COMPENSATION FOR TIRE DEFORMATION AND CASTER

CROSS REFERENCE TO RELATED APPLICATIONS

This application is a National Stage of International Application No. PCT/JP2010/052527 filed on Feb. 19, 2010, the contents of all of which are incorporated herein by reference in their entirety.

TECHNICAL FIELD

The present invention relates to a steering control device for controlling drive of a motor for imparting a power to a steering system in response to a steering operation of a driver.

BACKGROUND ART

An electric power steering device, which detects a steering torque and imparts an assist torque (steering assist torque) based on the steering torque, is known as a general steering device. A steering control device for controlling drive of the electric power steering device of this type controls the steering torque sensed by the driver steering the steering wheel, and thus constitutes an important factor forming steering feeling of a vehicle.

On this occasion, a road surface reaction force torque is a torque acting in a direction of returning the steering wheel to a neutral point by a tire lateral force acting between the road surface and steered wheels. The road surface reaction force torque may be small depending on a layout of the steering system, specifications of tires, and the like on some vehicles.

When the road surface reaction force torque is small in this way, the road surface reaction force torque cannot overcome a friction torque, which is relatively large. As a result, the road surface reaction force torque acting in the direction in which the steering wheel is returned to the neutral point becomes insufficient during the steering by the driver. It is thus necessary for the driver to intentionally apply a return torque to the steering wheel, thereby returning the steering wheel to the neutral point.

Moreover, when the road surface reaction force torque is small, it is difficult for the driver to sense, based on a reaction force transmitted to the hands of the driver, whether the steering wheel is at the neutral point, or the steering wheel is displaced from the neutral point and the vehicle is thus turning. It is thus necessary for the driver to visually confirm the steering wheel position so that the vehicle is stably controlled to travel straight. As described above, in a case where the road surface reaction force torque is small, there has been a problem that the steering feeling decreases.

In order to address this problem, an electronic control unit (ECU) drives a motor so as to impart a steering wheel return torque based on a steering angle and a direction of a steering angular velocity to a steering system in a conventional device described in Patent Literature 1, for example.

Moreover, an ECU estimates a rack shaft force from a steering angle based on a vehicle model, and carries out assist control based on the estimated rack shaft force value in a conventional device described in Patent Literature 2, for example.

Further, an ECU calculates an assist torque by using a result obtained by subtracting a steady-state response component, which can be mathematically calculated, from a steering response characteristic represented as a vehicle model out of response characteristics of the steering torque with respect to a steering angle in a conventional device described in Patent Literature 3, for example. This calculated assist torque cancels a characteristic of a high frequency component (non-steady state response component) out of the response characteristics of the steering torque with respect to the steering angle.

Moreover, an ECU compensates, in phase, a detected or estimated self-aligning torque in order to compensate a cornering force affected by a suspension geometry and a transmission delay of a self-aligning torque dynamic characteristic, and corrects a steering assist command value in a conventional device described in Patent Literature 4), for example.

CITATION LIST

Patent Literature

[PTL 1]: JP 2002-145100 A (p. 2, [0007] to [0021] and FIG. 2)
[PTL 2]: JP 2007-269251 A (p. 2, [0003] to [0010] and FIG. 2)
[PTL 3]: JP 2004-338616 A (p. 2, [0009] to [0012] and FIG. 2)
[PTL 4]: JP 2008-114687 A (p. 6, [0019], p. 9, [0042] to [0046], and FIG. 11)

SUMMARY OF INVENTION

Technical Problem

In the conventional devices described above, the assist torque is set based on the steering angle or a road surface reaction force torque (corresponding to the rack shaft force according to Patent Literature 2, and the steering torque by the manual steering according to Patent Literature 3) which is calculated from the steering angle by using the vehicle model. However, in the conventional devices, influence of a torque ($M_{S2}$: hereinafter, referred to as "twist torque of tire") transitionally generated by the tires themselves, which constitute a part of the steered wheels, elastically being deformed when a lateral slip angle is generated on the steered wheels is not considered in the vehicle model mathematically representing physical characteristics (transmission characteristics) of the vehicle from the steering angle to the road surface reaction force torque.

Specifically, in the conventional device, a calculated road surface reaction force torque ($M_R$) is approximated as a sum of a torque ($M_F$: hereinafter, referred to as caster-trail-caused torque) generated by a caster trail and a tire lateral force and a torque ($M_{S1}$: hereinafter, referred to as pneumatic-trail-caused torque) generated by an uneven distribution of the tire lateral force on the contact surface of the steered wheels. As a result, the road surface reaction force torque ($M_R$) is a state quantity in phase with the tire lateral force ($F_{yF}$).

On this occasion, the road surface reaction force torque ($M_R$) has a feature of leading in phase with respect to the tire lateral force ($F_{yF}$) in a steering frequency domain. Therefore, the road surface reaction force torque calculated by using the steering angle or the road surface reaction force torque calculated by using the steering angle and the vehicle model is different from the road surface reaction force torque actually acting on the steering shaft from the road surface.

Thus, the road surface reaction force torque which is different from the actual road surface reaction force torque is used to design the assist torque for the electric power steering device in the conventional devices. As a result, a control effect which a control designer intends to obtain is not sufficiently exerted, resulting in failure in realizing natural steering feeling in the conventional devices.

The present invention has been made in view of the above-mentioned problem, and therefore has an object to provide a steering control device capable of providing a control effect intended by a designer more easily and of realizing more natural steering feeling.

Solution to Problem

According to the present invention, there is provided a steering control device for controlling drive of a motor for imparting a power to a steering system, the steering control device including a steering control device main unit for carrying out filtering processing on a steering angle signal received from steering angle detection means for generating a steering angle signal corresponding to a steering angle of the steering system, by using a filter containing a predetermined frequency characteristic representing a vehicle characteristic from the steering angle to a self-aligning torque of a steered wheel of the steering system, and setting a drive torque of the motor based on a result of the filtering processing.

BRIEF DESCRIPTION OF DRAWINGS

FIG. 4 An explanatory diagram describing definitions of various symbols.

DESCRIPTION OF EMBODIMENTS

Figure 1:
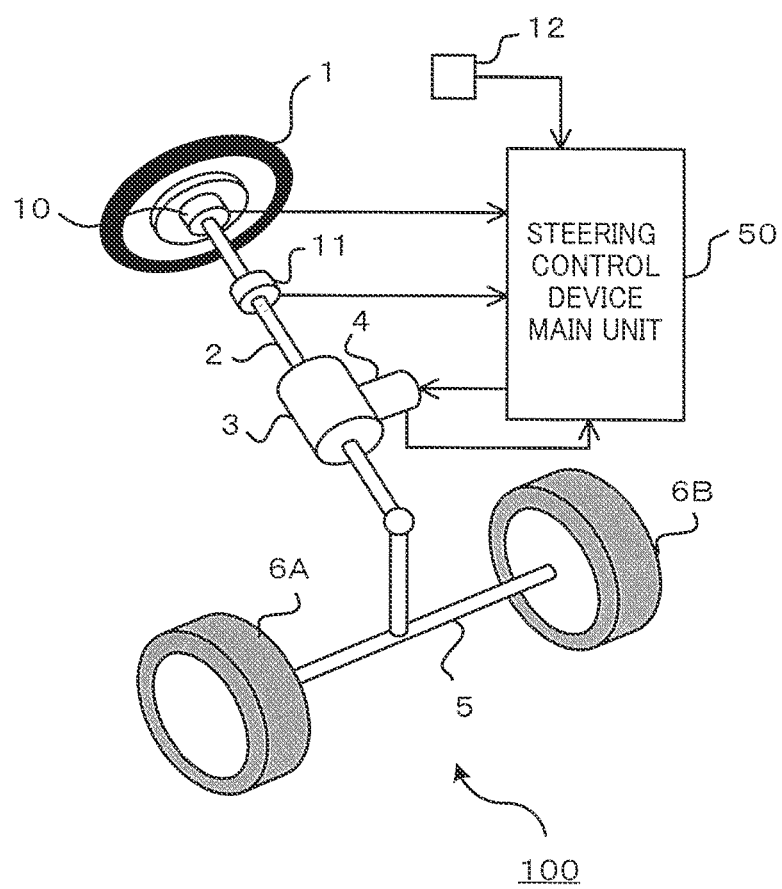
FIG. 1 A configuration diagram illustrating an electric power steering device according to a first embodiment of the present invention.

A description is now given of embodiments of the present invention referring to the drawings.

First Embodiment

FIG. 1 is a configuration diagram illustrating an electric power steering device according to a first embodiment of the present invention.

In FIG. 1, the electric power steering device 100 includes a steering wheel 1, a steering shaft 2, a speed reduction device 3, a motor 4, a tie rod 5, a gear box (not shown), and a pair of steered wheels 6A and 6B. The steering wheel 1, the steering shaft 2, the tie rod 5, the gear box, and the pair of steered wheels 6A and 6B constitute a steering system. The steering wheel 1 is fixed to one end of the steering shaft 2. Moreover, the steering wheel 1 is operated by a driver.

The speed reduction device 3 is attached to an intermediate portion of the steering shaft 2. The motor 4 is coupled to the steering shaft 2 via the speed reduction device 3. An intermediate portion of the tie road 5 is connected to the steering shaft 2 via the gear box. The pair of steered wheels 6A and 6B are rotatably attached to both ends of the tie rod 5. Steered angles of the pair of the steered wheels 6A and 6B change in response to a change in rotation angle of the steering wheel 1 operated by the driver.

The drive torque of the motor 4 is amplified by the speed reduction device 3, and is applied to the steering shaft 2. Thus, a torque after the amplification by the motor 4 and the steering torque generated by the driver rotating the steering wheel 1 are applied to the steering shaft 2. The sum of the drive torque by the motor 4 and the steering torque rotates the steering shaft 2 and the steered wheels 6A and 6B against a road surface reaction force torque transmitted from the steered wheels 6A and 6B to the steering shaft 2.

A steering angle sensor 10 is attached as steering angle detection means to the steering wheel 1. The steering angle sensor 10 generates a steering angle signal based on the steering angle of the steering wheel 1. A steering torque sensor 11 is attached as steering torque detection means to the steering shaft 2. The steering torque sensor 11 generates a steering torque signal based on the steering torque acting on the steering shaft 2.

An operation of the electric power steering device 100 is controlled by a steering control device main unit 50. The steering angle signal from the steering angle sensor 10, the steering torque signal from the steering torque sensor 11, and a vehicle speed signal from a vehicle speed sensor 12 serving as vehicle speed detection means are input to the steering control device main unit 50. The steering control device main unit 50 monitors the steering angle, the steering torque, and the vehicle speed by using the steering angle signal, respectively, the steering torque signal, and the vehicle speed signal. Moreover, the steering control device main unit 50 monitors a drive current of the motor 4. Further, the steering control device main unit 50 stores respective changes of the monitored steering angle, steering torque, vehicle speed, and drive current of the motor 4.

Moreover, the steering control device main unit 50 calculates an command current (steering assist current) required for generating the drive torque of the motor 4 based on the steering angle signal, the steering torque signal, and the vehicle speed signal. Moreover, the steering control device main unit 50 carries out current control (feedback control) so that the motor current based on the motor current signal coincides with the command current, and imparts an applied voltage obtained by the current control to the motor 4.

Figure 2:
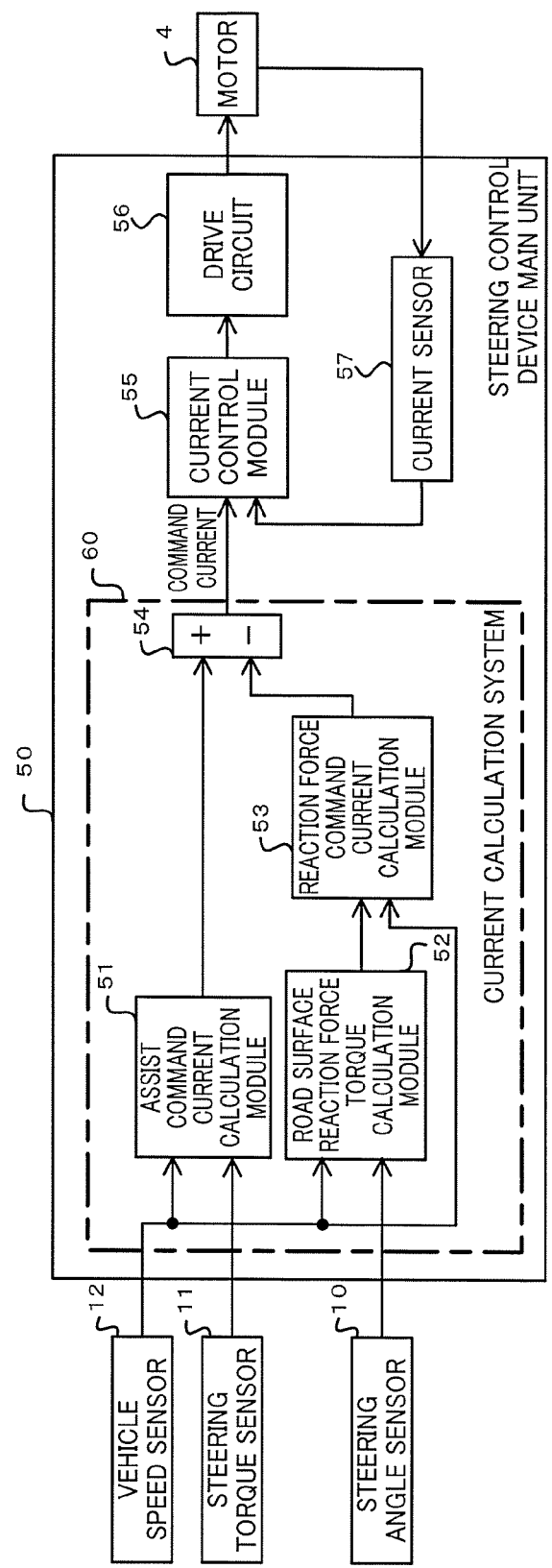
FIG. 2 A block diagram illustrating a steering control device main unit of FIG. 1.

FIG. 2 is a block diagram illustrating the steering control device main unit 50 of FIG. 1. In FIG. 2, the steering control device main unit 50 includes an assist command current calculation module 51, a road surface reaction force torque calculation module 52, a reaction force command current calculation module 53, a subtraction module 54, a current control module 55, a drive circuit 56, and a current sensor 57 serving as current detection means. On this occasion, calculation processing of calculating the command current from the steering angle by the road surface reaction force torque calculation module 52, the reaction force command current calculation module 53, and the subtraction module 54 corresponds to filtering processing.

The assist command current calculation module 51, the road surface reaction force torque calculation module 52, the reaction force command current calculation module 53, and the subtraction module 54 constitute a command current calculation system 60. The command current calculation system 60 calculates the command current.

Figure 3:
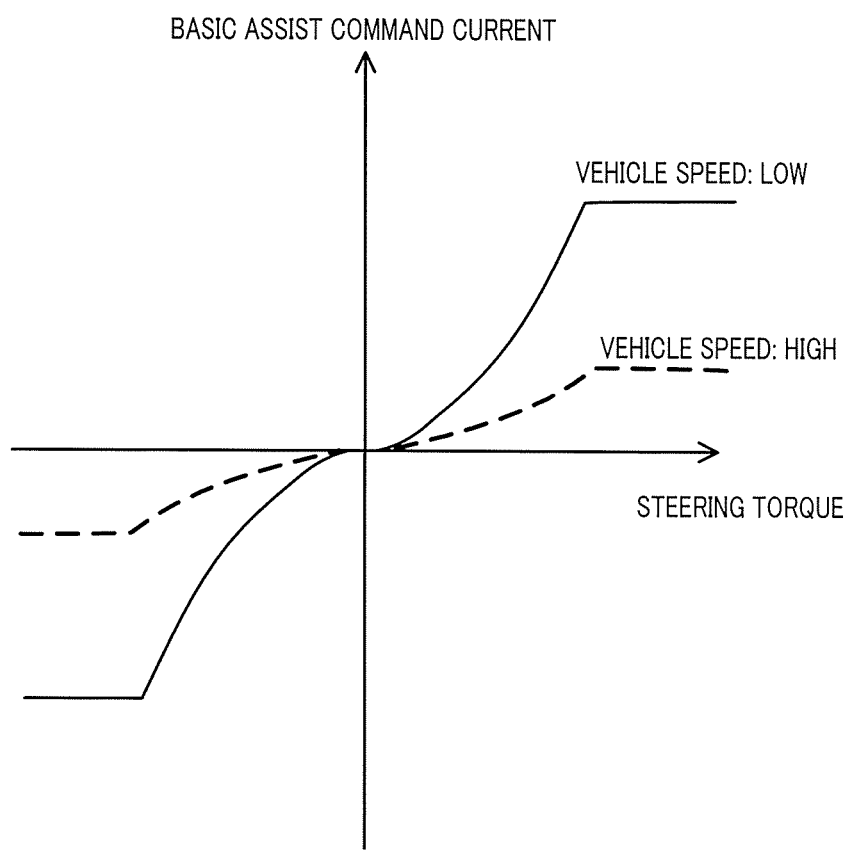
FIG. 3 A chart illustrating an example of an assist map.
Figure 5:
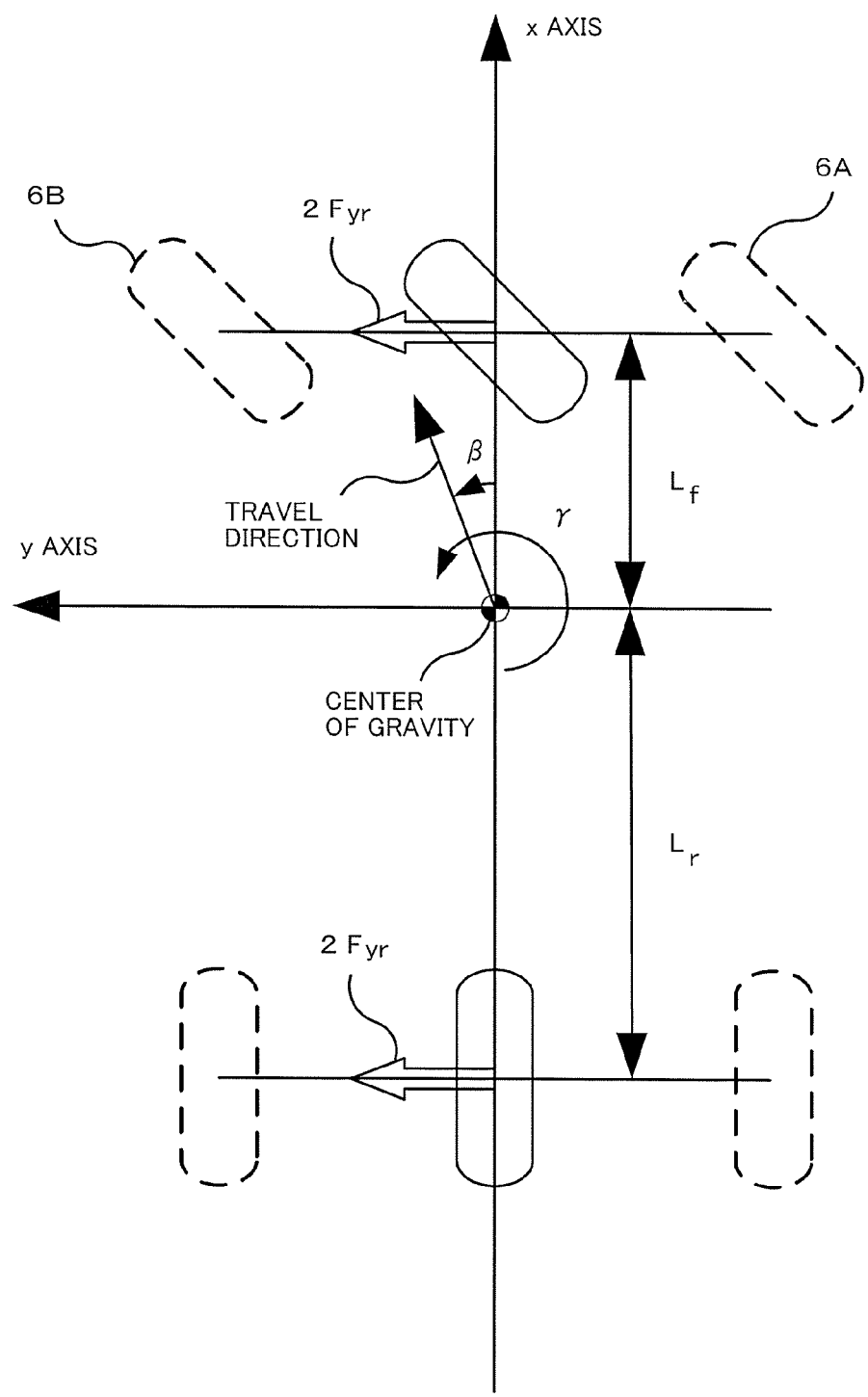
FIG. 5 A schematic diagram representing a four-wheel vehicle as an equivalent two-wheel model.
Figure 6:
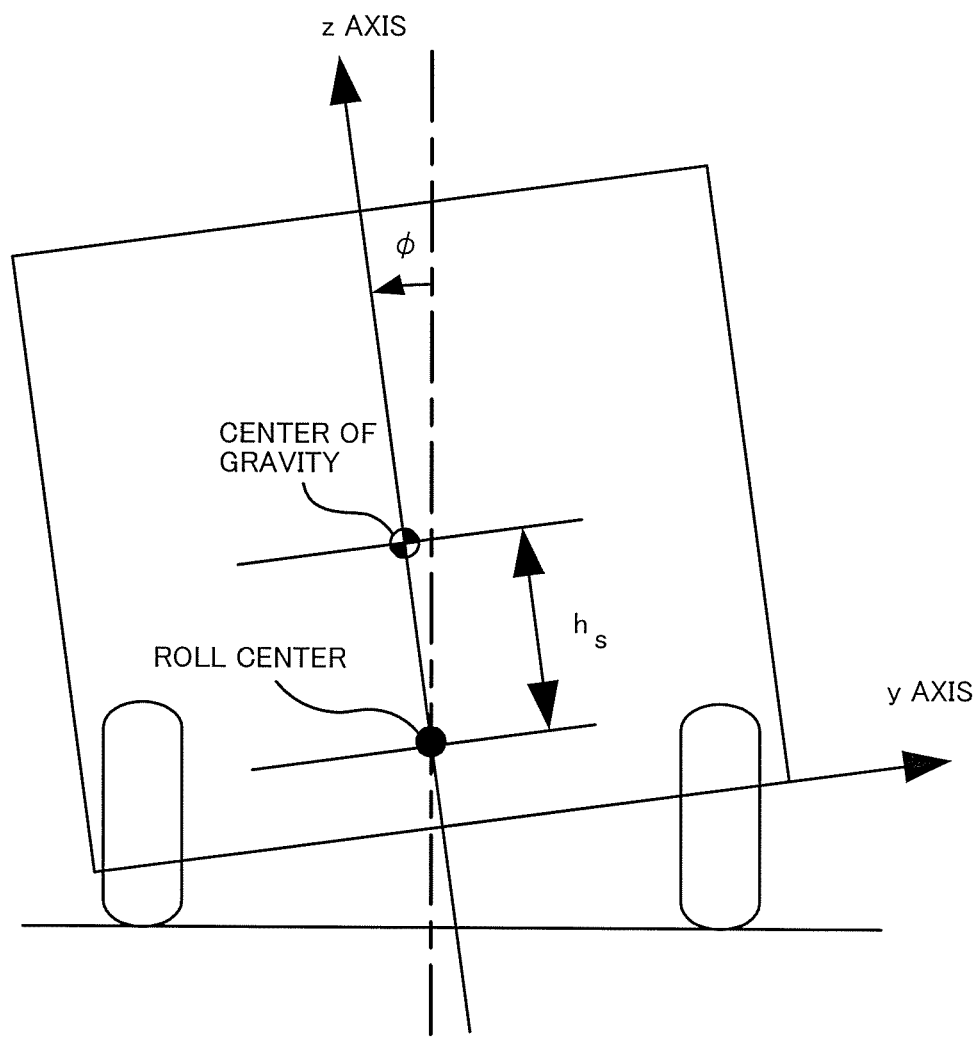
FIG. 6 A schematic diagram illustration a rotation movement about an x axis of a vehicle.
Figure 7:
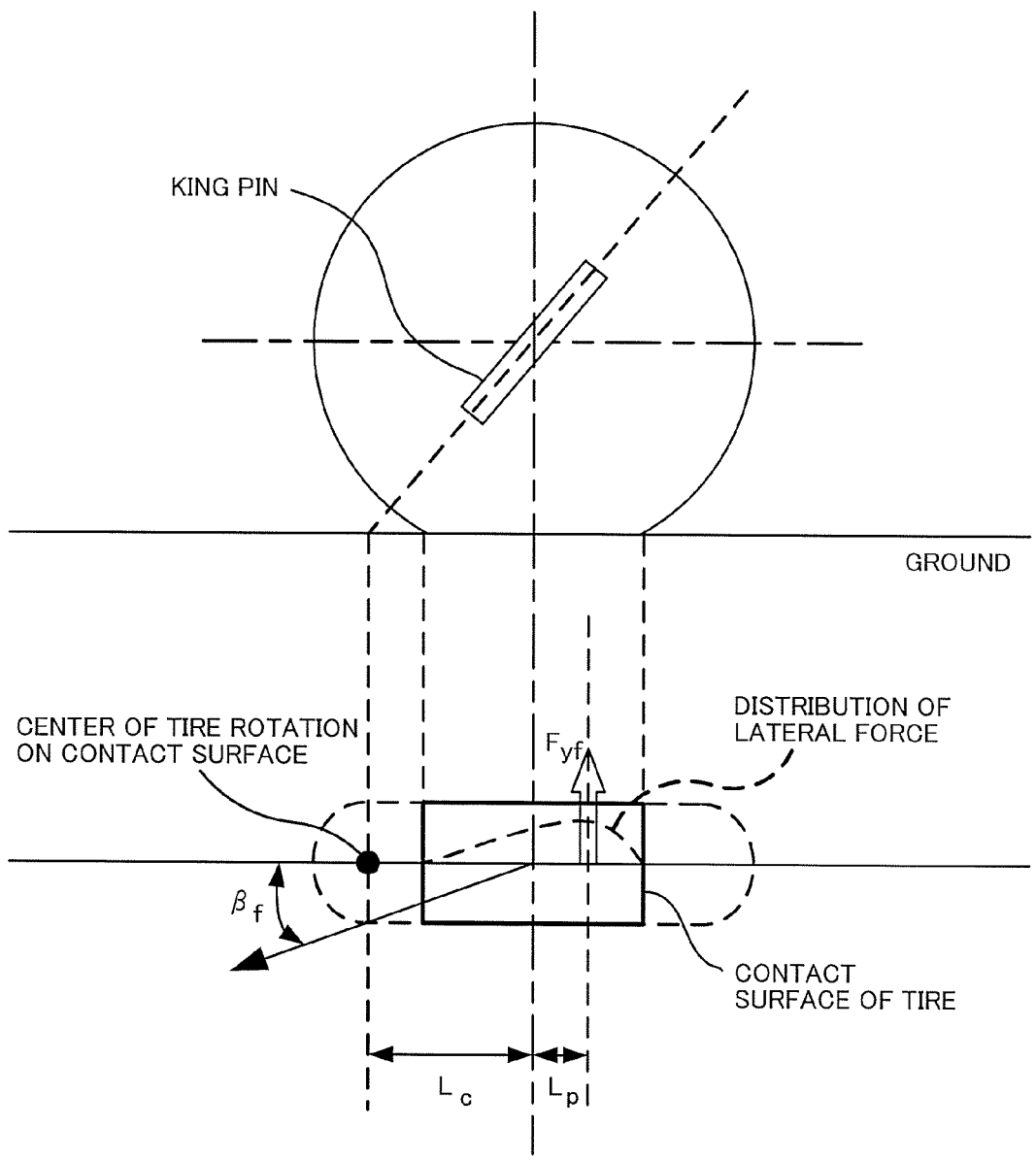
FIG. 7 A schematic diagram illustrating a tire model.
Figure 8:
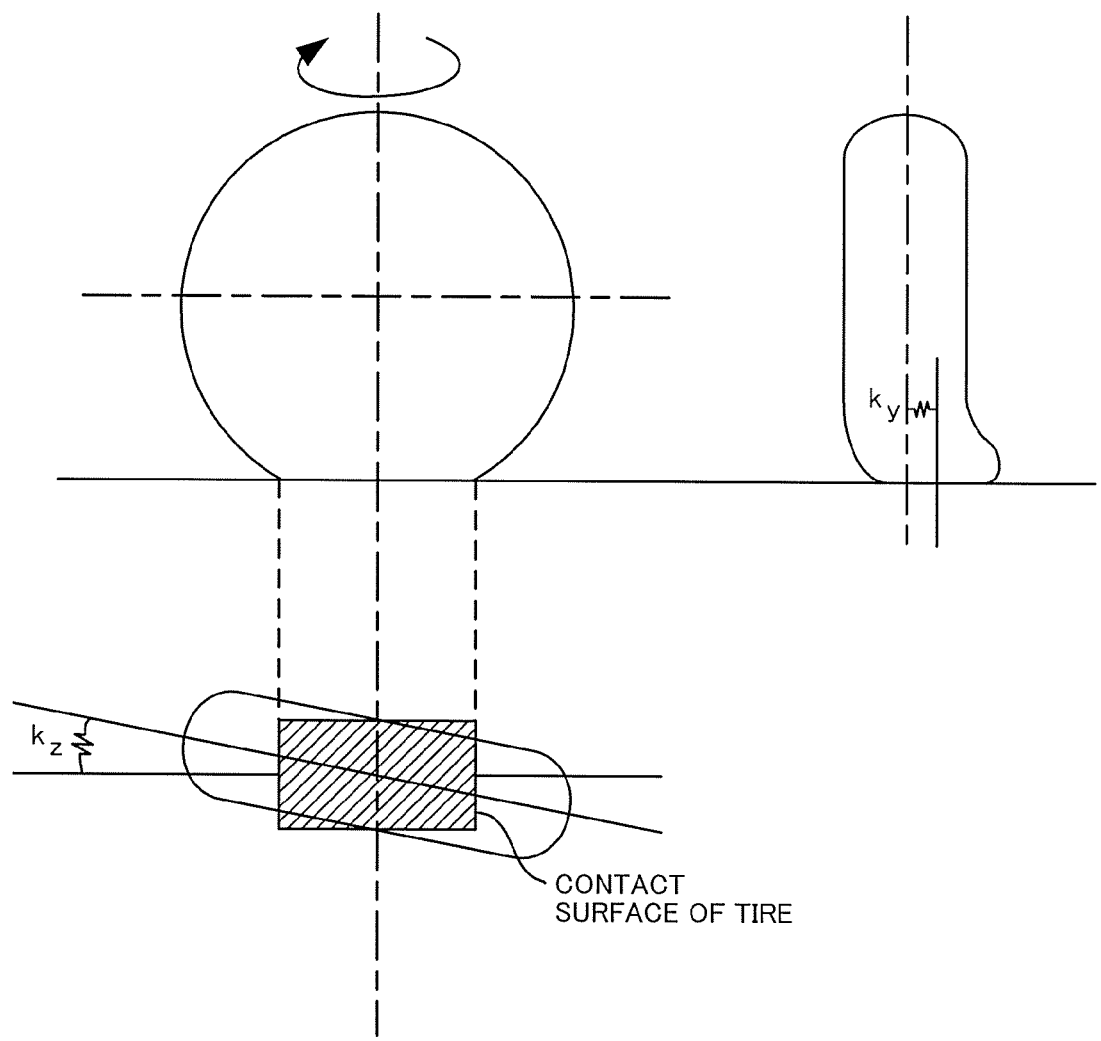
FIG. 8 A schematic diagram illustrating a tire stiffness.

The assist command current calculation module 51 calculates a basic assist command current for reducing the steering torque by the driver by using the vehicle speed and the steering torque. Specifically, an assist map as illustrated in FIG. 3, which shows values of the basic assist command current with respect to the vehicle speed and the steering torque, is registered in advance to the assist command current calculation module 51. The assist command current calculation module 51 calculates the basic assist command current by using the assist map, the vehicle speed, and the steering torque. A drive torque of the motor 4 corresponding to this basic assist command current is referred to as basic assist torque.

The road surface reaction force torque calculation module 52 respectively calculates a caster-trail-caused torque $M_F$, a self-aligning torque $M_S$, and a road surface reaction force torque $M_R$ by using the vehicle speed, the steering angle, and vehicle models (types of filter) represented by equations (1) to (13) described later. Note that, the self-aligning torque $M_S$ includes a pneumatic-trail-caused torque $M_{S1}$ generated by an uneven distribution of a tire lateral force $F_{yF}$ on the contact surface of the steered wheels 6A and 6B and a twist torque of tire $M_{S2}$ as represented by the equation (9) described later.

The reaction force command current calculation module 53 receives a calculation result of the road surface reaction force torque $M_R$ from the road surface reaction force torque calculation module 52. Moreover, the reaction force command current calculation module 53 calculates the reaction force command current by using the road surface reaction force torque $M_R$ and the vehicle speed. This reaction force command current is a current for adjusting the magnitude of the drive torque of the motor 4 so as to correspond to the magnitude of the road surface reaction force torque $M_R$.

The subtraction module 54 receives the calculation result of the basic assist command current from the assist command current calculation module 51. Moreover, the subtraction module 54 receives the calculation result of the reaction force command current from the reaction force command current calculation module 53. Further, the subtraction module 54 subtracts the reaction force command current from the basic assist command current, and transmits a current value obtained by the subtraction to the current control module 55 as a command current of the motor 4.

The current control module 55 monitors the motor current via the current sensor 57. Moreover, the current control module 55 calculates an applied current of the motor 4 based on the command current and the motor current so that the current flowing through the motor 4 coincides with the command current. The drive circuit 56 carries out a pulse width modulation (PWM) drive so as to impart the applied voltage calculated by the current control module 55 to the motor 4.

On this occasion, the steering control device main module 50 may be constituted by hardware (not shown) including an arithmetic processing device (CPU), a storage device (ROM, RAM, and the like), a signal input/output device, the drive circuit 56, and the current sensor 57. Programs for realizing functions of the assist command current calculation module 51, the road surface reaction force torque calculation module 52, the reaction force command current calculation module 53, the subtraction module 54, and the current control module 55 are stored in the storage device of this hardware.

A more specific description is now given of the calculation processing by the command current calculation system 60. The command current calculation system 60 reads the vehicle speed V and the steering angle $\theta_h$, and calculates the road surface reaction force torque $M_R$ by using the vehicle models represented by the following equations (1) to (13). Note that, these vehicle models are stored in the steering control device main unit 50 in advance. Moreover, various symbols (parameters) used for the calculation processing by the steering control device main unit 50 are defined as illustrated in FIG. 4. Further, the various symbols used for the calculation processing by the steering control device main unit 50 correspond to vehicle models illustrated in FIGS. 5 to 8.

Models of a motion from the steering angle $\theta_h$ to the tire lateral force $F_{yF}$ generated on the steered wheels are represented by the following equations (1) to (6).

Conversion from the steering angle $\theta_h$ to a steered angle $\delta$ of the steered wheels:

[Math. 1]

$$\delta = \frac{\theta_h}{G} \tag{1}$$

An equation of motion in a y axis (lateral) direction of the vehicle:

[Math. 2]

$$mV\left(\frac{d\beta}{dt} + \gamma\right) - m_s h_s \frac{d^2\phi}{dt^2} = 2F_{yf} + 2F_{yr} \tag{2}$$

An equation of rotational motion about a z axis (vertical direction axis):

[Math. 3]

$$I_z \frac{d\gamma}{dt} - I_{z\phi} \frac{d^2\phi}{dt^2} = 2L_f F_{yf} - 2L_r F_{yr} \quad (3)$$

An equation of rotational motion about an x axis (chassis longitudinal axis):

[Math. 4]

$$I_\phi \frac{d^2\phi}{dt^2} - I_{z\phi} \frac{d\gamma}{dt} - m_s h_s V\left(\frac{d\beta}{dt} + \gamma\right) = (-K_\phi + m_s g h_s)\phi - C_\phi \frac{d\phi}{dt} \quad (4)$$

A tire lateral force (cornering force) generation model:

[Math. 5]

$$\frac{K_f}{k_y V} \frac{dF_{yf}}{dt} + F_{yf} = -K_f\left(\beta + \frac{L_f \gamma}{V} - R_{sf}\phi - \delta\right) \quad (5)$$

$$\frac{K_r}{k_y V} \frac{dF_{yr}}{dt} + F_{yr} = -K_r\left(\beta - \frac{L_r \gamma}{V} - R_{sr}\phi\right) \quad (6)$$

A model of the road surface reaction force torque $M_R$ acting on the steering shaft 2 by the tire lateral force is represented by the following equation (7).

[Math. 6]

$$M_R = M_F + M_S \quad (7)$$

$$M_F = 2L_c F_{yf} / G_s \quad (8)$$

$$M_S = M_{S1} + M_{S2} \quad (9)$$

$$M_{S1} = 2L_P F_{yf} / G_s \quad (10)$$

$$T_1 \frac{d\lambda}{dt} + \lambda = \beta + \frac{L_f \gamma}{V} - R_{sf}\phi - \delta \quad (11)$$

$$M_{S2} = 2k_z\left[\lambda - \left(\beta + \frac{L_f \gamma}{V} - R_{sf}\phi - \delta\right)\right] / G_s \quad (12)$$

$$T_1 = \frac{L_t}{V} \quad (13)$$

The road surface reaction force torque $M_R$ includes the caster-trail-caused torque $M_F$ and the self-aligning torque $M_S$, which is a moment about the vertical axis of the tire, as represented by this equation (7). The caster-trail-caused torque $M_F$ can be calculated by using the equation (8). The self-aligning torque $M_S$ can be calculated by using the equation (9).

Further, the self-aligning torque $M_S$ includes the pneumatic-trail-caused torque $M_{S1}$ generated by the uneven distribution of the tire lateral force $F_{yF}$ on the contact surface of the steered wheels 6A and 6B and the twist torque of tire $M_{S2}$ as represented by the equation (9). The pneumatic-trail-caused torque $M_{S1}$ can be calculated by using the equation (10).

The twist torque of tire $M_{S2}$ can be modeled as represented by the equations (11) to (13). A gain constitutes a phase lead element based on tire twist stiffness, namely the gain constitutes a high-pass filter characteristic based on the tire twist stiffness, with respect to a front wheel lateral slip angle, thereby representing the twist torque of tire $M_{S2}$ according to the equations (11) to (13).

Note that, a tire twist response time constant $T_1$ is a time constant changing depending on the vehicle velocity, and can be set as represented by the equation (13). Moreover, a tire twist response distance $L_1$ means a travel distance required for releasing a twist of the tire after steering. Further, the road surface reaction force torque $M_R$ leads in phase with respect to the tire lateral force $F_{yF}$ in a steering frequency range, and has a characteristic that influence thereof is more remarkable in a low speed range.

Moreover, a coefficient "2" on the right side of the equations (8), (10), and (12) represents right and left wheels, namely two wheels in total. Further, the right sides of the equations (8), (10), and (12) are divided by an overall steering gear ratio $G_S$ to convert the road surface reaction force torque to a torque acting on the steering shaft 2.

Moreover, in some cases, the overall steering gear ratio $G_S$ is designed so as to be variable depending on the steering angle, and an estimated rack shaft force value may be different from the road surface reaction force torque actually acting on the steering shaft from the road surface. The road surface reaction force torque actually acting on the steering shaft from the road surface can be accurately calculated by considering the overall steering gear ratio $G_S$ as in the equations (8), (10), and (12).

The vehicle models represented by the equations (1) to (13) include the vehicle speed V as a parameter (variable) on this occasion. Therefore, the calculated results of the caster-trail-caused torque $M_F$ and the self-aligning torque $M_S$ change depending on the vehicle speed V.

Figure 9:
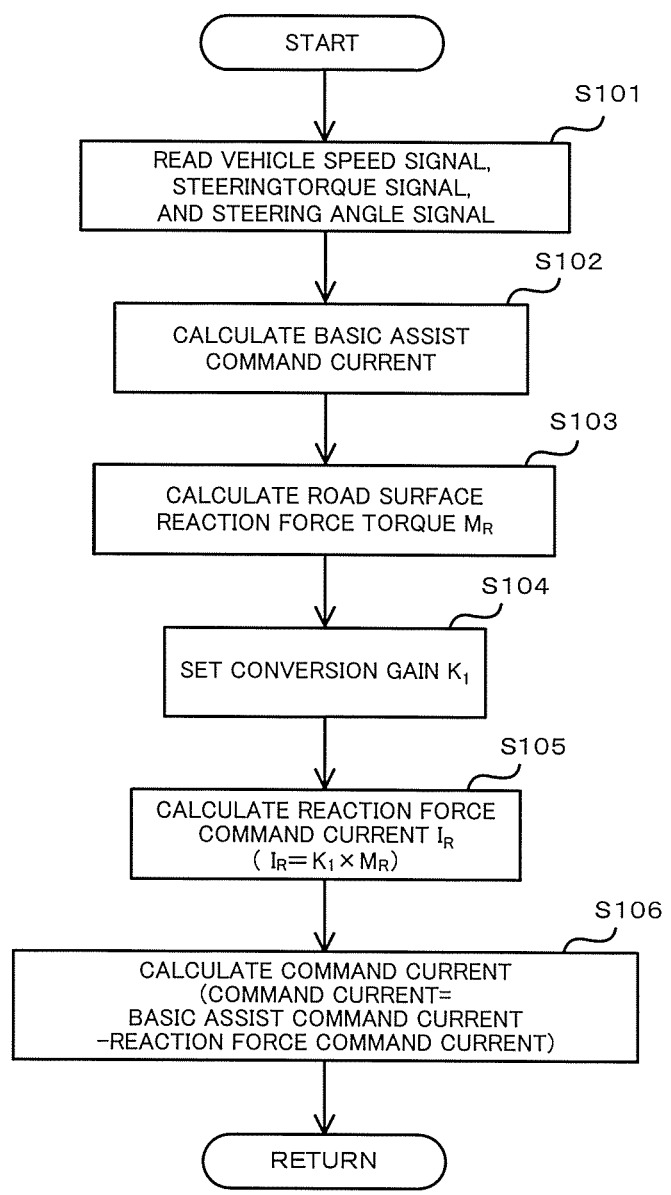
FIG. 9 A flowchart illustrating an operation of a command current calculation system of FIG. 2.

A description is now given of an operation of the command current calculation system 60. FIG. 9 is a flowchart illustrating the operation of the command current calculation system 60 of FIG. 2. In FIG. 9, the command current calculation system 60 reads the stored vehicle speed, steering torque, and steering angle (Step S101). Then, the command current calculation system 60 calculates the basic assist command current by using the assist map and the read vehicle speed and steering torque (Step S102).

Moreover, the command current calculation system 60 calculates the road surface reaction force torque $M_R$ from the read vehicle speed and steering angle by using the vehicle models represented by the equations (1) to (13) (Step S103). Then, the command current calculation system 60 sets a conversion gain $K_1$ by using a conversion gain map (refer to FIG. 10) set in advance and the vehicle speed (Step S104). Then, the command current calculation system 60 calculates a reaction force command current $I_R$ by multiplying the conversion gain $K_1$ and the road surface reaction force torque $M_R$ by each other as represented by the following equation (14).

[Math. 7]

$$I_R = K_1 M_R \quad (14)$$

Then, the command current calculation system 60 calculates the command current by subtracting the reaction force command current $I_R$ from the basic assist command current (Step S106). Information on the calculated command current is transmitted to the current control module 55, and a current corresponding to the command current is controlled to flow through the motor 4 by the current control module 55. Then, the command current calculation system 60 repeats the processing in Steps S101 to S106.

Figure 10:
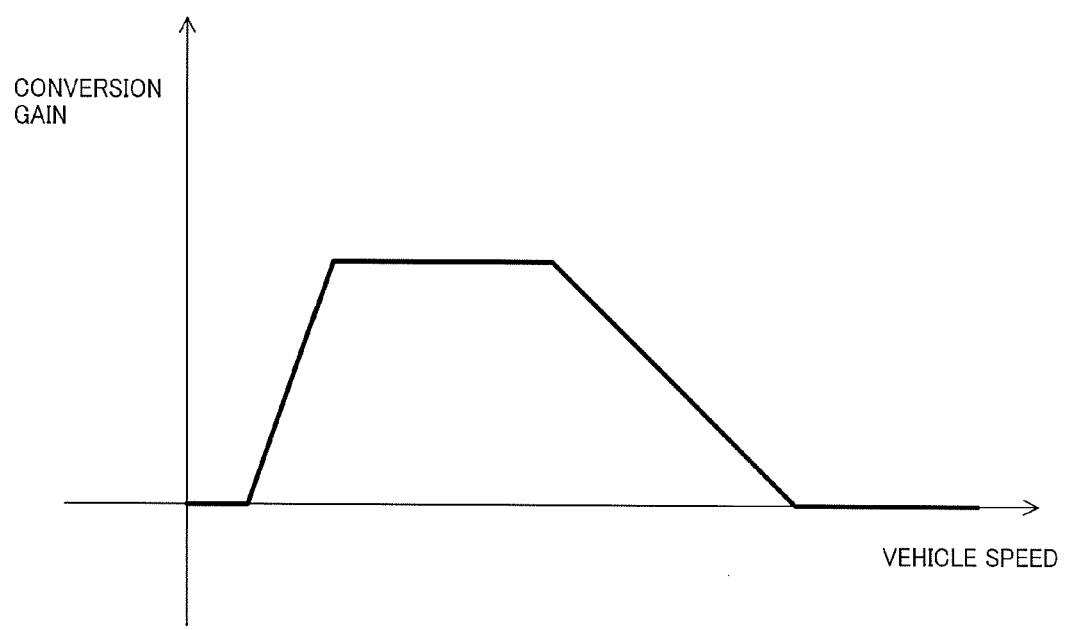
FIG. 10 A chart illustrating an example of a conversion gain map.

On this occasion, the conversion gain $K_1$ from the road surface reaction force torque $M_R$ to the reaction force command current $I_R$ is set in advance to values that vary depending on the vehicle speed as illustrated in FIG. 10. Specifically, a main purpose thereof is to reduce the steering torque at an extremely low speed range including 0 km/h of the vehicle speed. Therefore, the conversion gain $K_1$ is set so that the reaction force command current $I_R$ is 0 in the extremely low speed range. As a result, the steering torque decreases in the extremely low speed range, and operability is emphasized in the steering feeling in the extremely low speed range.

Moreover, the gradient of the steering torque with respect to the steering angle is basically small in a low speed range. Therefore, the conversion gain $K_1$ in the low speed range is set to a large value. As a result, the steering feeling improves. Further, the gradient of the steering torque with respect to the steering angle is basically large in a high speed range. Therefore, the conversion gain $K_1$ is set to a value smaller than that in the low speed range. As a result, the gradient of the steering torque with respect to the steering angle increases in an appropriate range.

The conversion gain $K_1$ is set to values that vary depending on the vehicle speed in this way, and more appropriate operability is thus realized while a steering reaction force feeling (so-called on-center feeling) is improved. Thus, the steering feeling can be improved over the entire speed range by changing the conversion gain $K_1$ depending on the vehicle speed.

A description is now given of control effect obtained by using the reaction force command current calculated by the reaction force command current calculation module 53. First, some drivers prefer artificial steering feeling in which the characteristic of the steering torque with respect to the steering angle is set to flat up to the high frequency as in the conventional device described in Patent Literature 3. In contrast, other drives prefer natural steering feeling in which the characteristic of the steering torque with respect to the steering angle is close to a manual steering (characteristic of a vehicle itself).

Particularly, when the caster trail is small due to a restriction on a layout of the vehicle, or when the pneumatic trail is small due to tire specifications, the road surface reaction force torque $M_R$ is small. When the road surface reaction force torque $M_R$ is small as in this case, a ratio of a change in steering torque to a change in steering angle is small, resulting in an insufficient steering reaction force feeling. Therefore, the steering feeling degrades.

It is an object to obtain a control effect which realizes the natural steering feeling close to the manual steering. In other words, it is an object to obtain a control effect realizing natural steering feeling close to the manual steering by calculating the road surface reaction force torque $M_R$ acting on the steered wheels 6A and 6B, and by artificially increasing the road surface reaction force torque by imparting the reaction force based on the calculated road reaction force torque $M_R$ from the motor 4 to the steering shaft 2.

A description is now given of an effect resulting from consideration of the twist torque of tire $M_{S2}$ in the road surface reaction force torque calculation module 52 when this control effect is tried to be obtained. Solid lines of FIGS. 11(a) and (b) represent frequency characteristics from the steering angle to the caster-trail-caused torque $M_F$ obtained from actually measured data at a vehicle speed of 40 km/h of an actual vehicle. Solid lines of FIGS. 11(c) and (d) represent frequency characteristics from the steering angle to the self-aligning torque $M_S$ obtained from actually measured data at the vehicle speed of 40 km/h of the actual vehicle.

The caster-trail-caused torque $M_F$ (in phase with the tire lateral force $F_{yF}$) and the self-aligning torque $M_S$ are different in phase as illustrated in FIG. 11. Specifically, the self-aligning torque $M_S$ leads in phase with respect to the caster-trail-caused torque $M_F$. Moreover, the self-aligning torque $M_S$ is larger in degree of decrease in gain around a steering frequency 2 Hz than the caster-trail-caused torque $M_F$.

Further, the gain of the self-aligning torque $M_S$ is larger than the gain of the caster-trail-caused torque $M_F$. Moreover, the self-aligning torque $M_S$ is larger in ratio to the entire road surface reaction force torque $M_R$ than the caster-trail-caused torque $M_F$. Thus, it is necessary to accurately calculate the self-aligning torque $M_S$ in order to accurately calculate the road surface reaction force torque $M_R$.

Figure 11A:
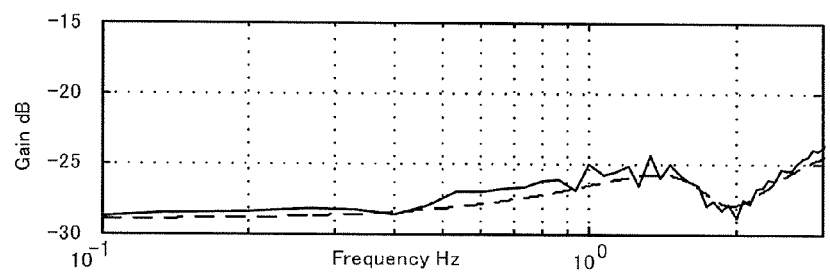
FIG. 11 Charts illustrating frequency characteristics based on a measured value and a frequency response for vehicle models.
Figure 11B:
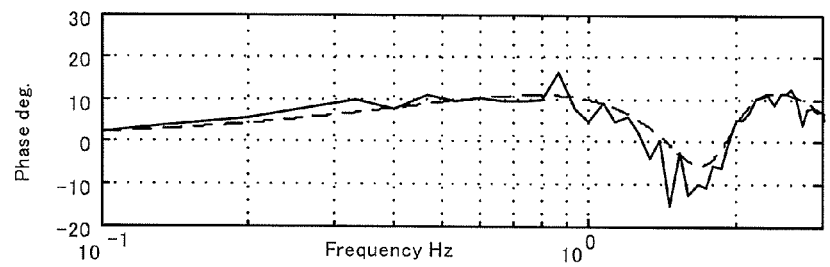
Figure 11C:
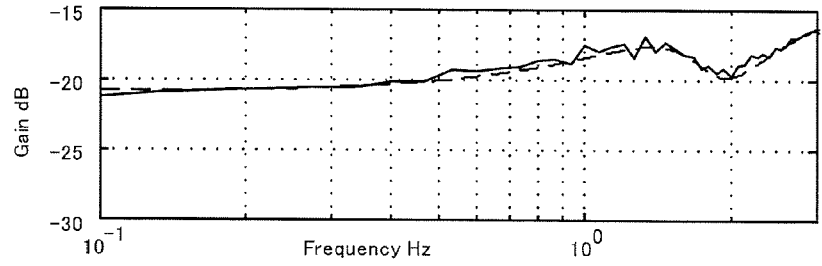
Figure 11D:
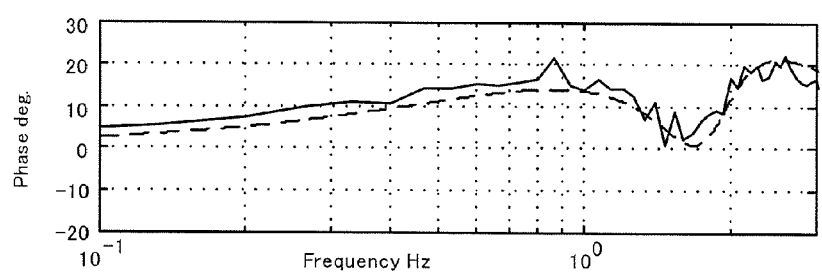

Then, broken lines of FIGS. 11(a) and (b) represent frequency responses from the steering angle to the caster trail caused torque $M_F$ in the vehicle models. Broken lines of FIGS. 11(c) and (d) represent frequency responses from the steering angle to the self-aligning torque $M_S$ in the vehicle models. As illustrated in FIG. 11, the consideration of the twist torque of tire $M_{S2}$ results in the self-aligning torque $M_S$ close to the actually measured value.

The road surface reaction force torque $M_R$, which is the sum of the caster-trail-caused torque $M_F$ and the self-aligning torque $M_S$, is also a vehicle model more close to an actually measured value. If the road surface reaction force torque $M_R$ is approximated by and calculated as $M_F+M_{S1}$ without considering the twist torque of tire $M_{S2}$ as in the conventional case, a difference between the calculated road surface reaction force torque $M_R$ and the actual road surface reaction force torque $M_R$ is relatively large.

Figure 12A:
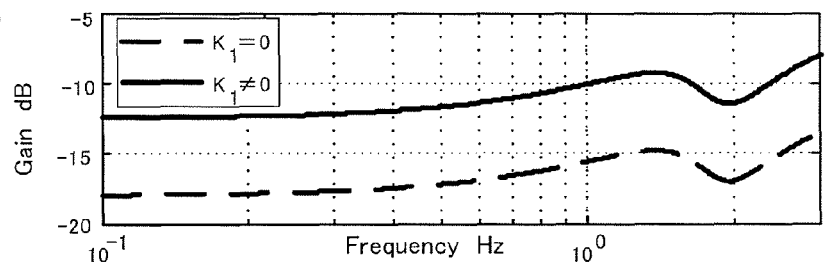
FIG. 12 Charts representing frequency characteristics for describing an effect for a case where a reaction force command current is calculated based on a road surface reaction force torque.
Figure 12B:
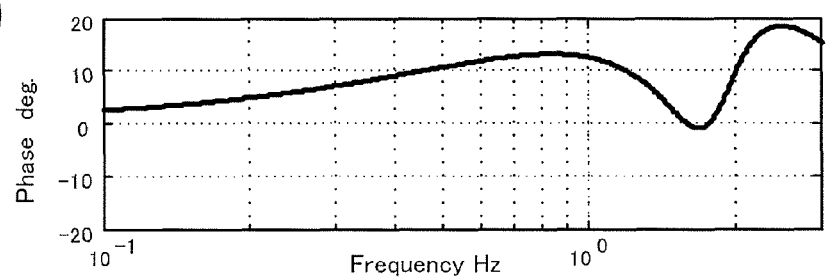

An effect obtained when the reaction force command current is calculated using the road surface reaction force torque $M_R$ ($=M_F+M_{S1}+M_{S2}$) is then illustrated in FIGS. 12(a) and (b). Note that, FIG. 12(b) illustrates a characteristic that a solid line and a broken line coincide with each other. Broken lines of FIGS. 12(a) and (b) represent frequency characteristics from the steering angle to the road surface reaction force torque $M_R$ obtained when the reaction force command current is 0 ($K_1$=0). Solid lines of FIGS. 12(a) and (b) represent results obtained when the reaction force command current is calculated using the road surface reaction force torque $M_R$, and the road surface reaction force torque $M_R$ is artificially increased (result of an increase in a steering reaction force torque by the road surface reaction force torque $M_R$ and the assist torque by the reaction force command current).

As illustrated in FIGS. 12(a) and (b), if the reaction force command current is calculated using the road surface reaction force torque $M_R$, the phase of the road surface reaction force torque $M_R$ does not change almost at all, only the gain is increased, the phase characteristic of the manual steering is maintained, the steering reaction force feeling is increased, and the steering characteristic of the manual steering is emphasized.

Figure 12C:
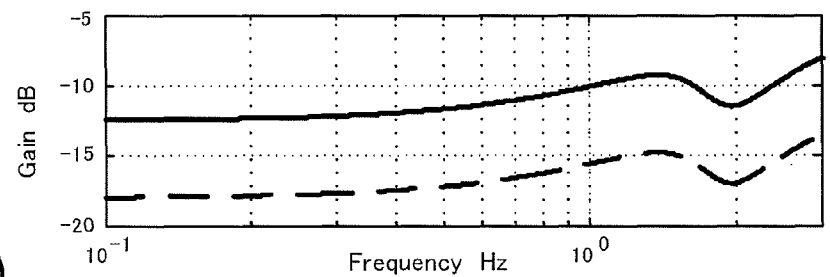
Figure 12D:
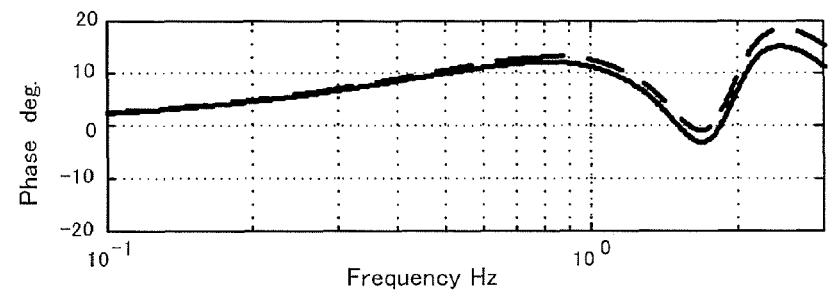

Broken lines of FIGS. 12(c) and (d) represent frequency characteristics from the steering angle to the road surface reaction force torque $M_R$ obtained when the reaction force command current is 0. Solid lines of FIGS. 12(c) and (d) represent results obtained when the reaction force command current is calculated using $M_F+M_{S1}$, and the road surface reaction force torque $M_R$ is artificially increased (result of an increase in the steering reaction force torque by the road surface reaction force torque $M_R$ and the assist torque by the reaction force command current). As illustrated in FIGS. 12(c) and (d), the increasing characteristic of the gain is almost equivalent to the characteristic represented by the solid line of FIG. 12(a), but the phase lags behind the characteristic of the road surface reaction force torque $M_R$ represented by the broken line of FIG. 12(b) in a frequency range equal to or more than approximately 1 Hz.

FIG. 13 illustrate Lissajous waveforms of the steering torque with respect to the steering angle at a sinusoidal wave steering at 0.2 Hz (low frequency steering) at a vehicle velocity 40 km/h. This 0.2 Hz sinusoidal wave steering is a steering pattern corresponding to an ordinary lane change, and is frequently carried out. FIG. 13(a) is a result obtained when the steering by the driver is assisted based on the steering torque detected by the steering torque sensor 11 and the vehicle speed detected by the vehicle speed sensor 12.

On this occasion, feeling of friction increases as a hysteresis width of the Lissajous waveform increases. Moreover, steering reaction force feeling lacks more as the gradient of the steering torque with respect to the steering angle close to the origin decreases, and it is difficult for the driver to recognize whether the vehicle is traveling straight or turning, resulting in degradation of the steering feeling. Therefore, control and vehicle characteristics are adjusted in order to solve the degradation in the steering feeling. However, there are proper values for both the friction feeling and the steering reaction force feeling, if the friction feeling is extremely low or the steering reaction force feeling is extremely large, the steering feeling degrades.

Figure 13A:
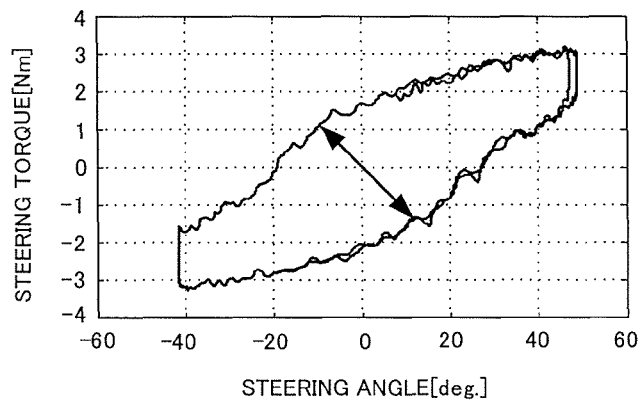
FIG. 13 Lissajous waveforms of a steering torque with respect to the steering angle at a sinusoidal wave steering at 0.2 Hz, and at a vehicle speed of 40 km/h.
Figure 13B:
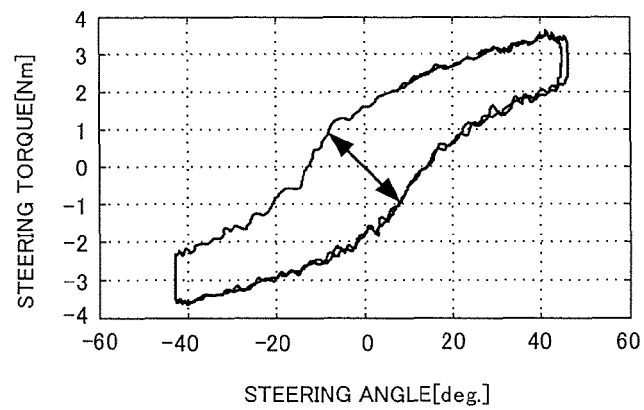
Figure 13C:
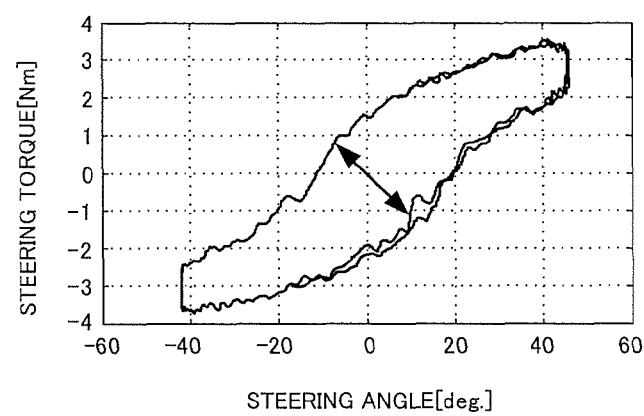
Figure 13D:
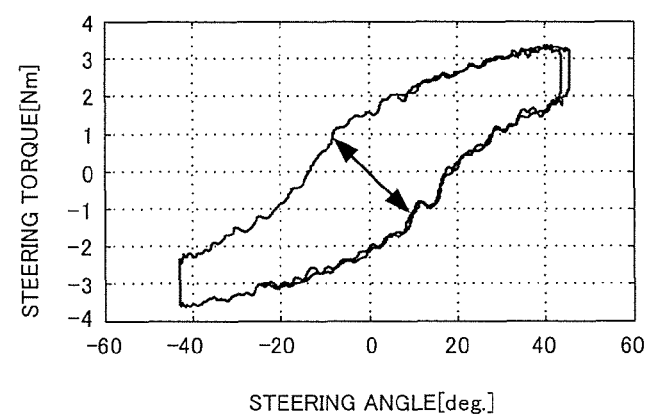

The Lissajous waveforms illustrated in FIGS. 13(b) to (d) represent control carried out based on the following specifications so that the gradients of the steering torque with respect to the steering angle close to the origin are the same. The Lissajous waveform of FIG. 13(b) represents a result of subtraction of a reaction force command current proportional to the steering angle from the basic assist command current. It is found that the gradient of the steering torque with respect to the steering angle is large, and the steering reaction force feeling is thus improved from FIG. 13(b). However, if the reaction force command current proportional to the steering angle is used, the phase of the reaction force command current and the phase of the road surface reaction force torque in this case do not coincide with each other, and hence the hysteresis width of the Lissajous waveform becomes too narrow, resulting in degradation of the steering feeling.

The Lissajous waveform of FIG. 13(c) is a result obtained when the motor 4 is driven by a command current obtained by subtracting a reaction force command current proportional to $M_F + M_{S1}$ in phase with the tire lateral force $F_{YF}$ from the basic assist command current. The Lissajous waveform of FIG. 13(d) is a result obtained when the motor 4 is driven by a command current obtained by subtracting a reaction force command current proportional to the road surface reaction force torque $M_R (= M_F + M_{S1} + M_{S2})$ from the basic assist command current.

The gradients of the steering torque with respect to the steering angle close to the origin increase to a level as high as that of FIG. 13(b) on the Lissajous waveforms illustrated in FIGS. 13(c) and (d), and it is thus found that the steering reaction force feeling is improved. The hysteresis widths of the Lissajous waveforms of FIGS. 13(c) and (d) are narrower than that of the Lissajous waveform of FIG. 13(a), and are wider than that of the Lissajous waveform of FIG. 13(b). From these facts, it is found that the friction feeling is proper, and natural steering feeling is realized.

On this occasion, for the steering at 0.2 Hz, the phase and the gain of $M_F + M_{S1}$ in phase with the tire lateral force $F_{YF}$ are approximately equivalent to the phase and the gain of the road surface reaction force torque $M_R$. Therefore, even for $M_F + M_{S1}$, the road surface reaction force torque can be artificially increased, and natural steering feeling close to the manual steering can be realized.

FIG. 14 illustrate results of a sinusoidal steering at 2 Hz (high-frequency steering) at a vehicle speed of 40 km/h. The sinusoidal steering at 2 Hz corresponds to steering carried out when a vehicle makes a relatively quick lane change, or a vehicle returns to the center in a lane if the vehicle gets too close to one side in the lane. Note that, the sinusoidal steering at 2 Hz is a steering pattern relatively frequently carried out, though the sinusoidal steering at 2 Hz is not as frequent as the sinusoidal steering at 0.2 Hz. Moreover, respective control specifications of FIGS. 14(a) to (d) are the same as the control specifications of FIGS. 13(a) to (d).

Figure 14A:
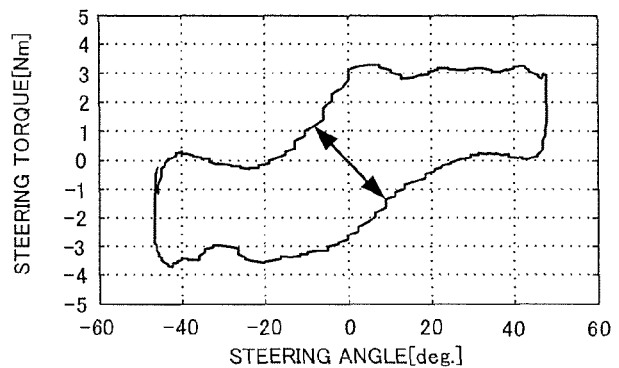
FIG. 14 Lissajous waveforms of the steering torque with respect to the steering angle at a sinusoidal wave steering at 2 Hz, and a vehicle speed of 40 km/h.

A Lissajous waveform of FIG. 14(a) represents a result obtained when the steering by the driver is assisted based on the steering torque and the vehicle speed. From FIG. 14(a), the hysteresis width of the Lissajous waveform is large, and it is thus found that the friction feeling is remarkable. Moreover, the gradient of the steering torque with respect to the steering angle is small, and it is thus found that the steering reaction force feeling is insufficient. Further, the steering torque after a change in steering direction is approximately zero, and it is thus found that the reaction force torque for returning the steering wheel position to the center position is insufficient.

Figure 14B:
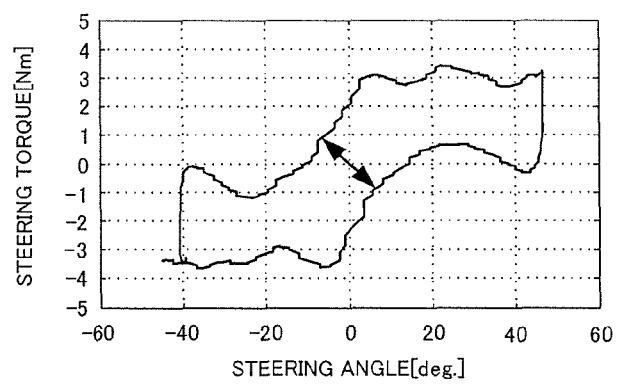

The Lissajous waveform of FIG. 14(b) represents a result of subtraction of the reaction force command current proportional to the steering angle from the basic assist command current. From FIG. 14(b), it is found that the steering torque is approximately 0 after the change in steering direction. The Lissajous waveform of FIG. 14(c) is a result obtained when the motor 4 is driven by a command current obtained by subtracting a reaction force command current proportional to $M_F + M_{S1}$ in phase with the tire lateral force $F_{YF}$ from the basic assist command current.

Figure 14C:
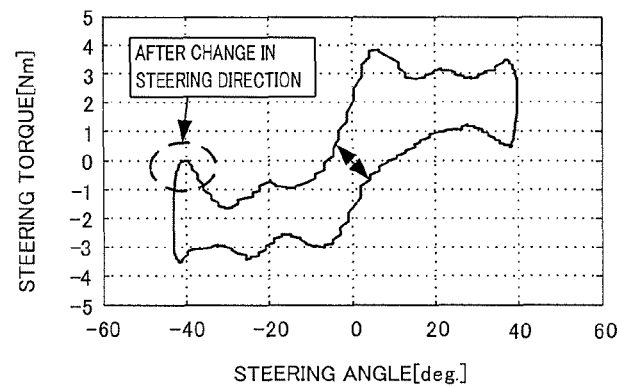

On this occasion, for the Lissajous waveform of FIG. 14(c), the phase of $M_F + M_{S1}$ is different from the phase of the actual road surface reaction force torque. Therefore, the hysteresis width is extremely narrow in a neighborhood of the steering angle of 0 degrees. Moreover, the steering torque after the change in steering direction is approximately 0. In this way, for the control specifications illustrated in FIGS. 14(b) and (c), the Lissajous waveforms are not smooth, and there arises a problem that non-smooth steering reaction force feeling is brought about.

Figure 14D:
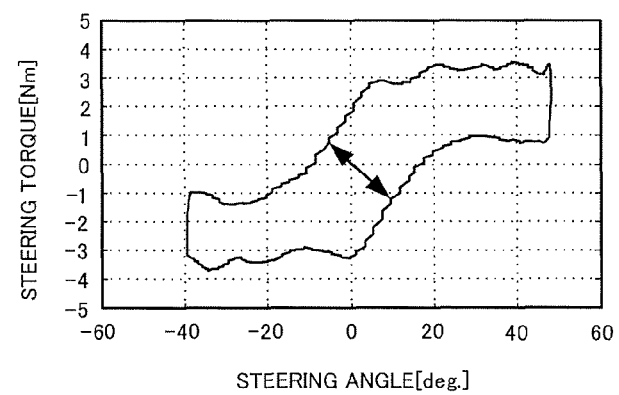

FIG. 14(d) illustrates a result obtained when the motor 4 is driven by a command current obtained by subtracting a reaction force command current proportional to the road surface reaction force torque $M_R (= M_F + M_{S1} + M_{S2})$ from the basic assist command current. From FIG. 14(d), it is found that a change rate of the steering torque with respect to the steering angle close to 0 degrees increases, and a proper steering reaction force feeling is realized. Moreover, the steering torque after the change in steering direction is not close to 0, and a smooth Lissajous waveform is brought about. Further, a proper hysteresis width is provided, resulting in a reduction in the friction feeling.

As described above, according to the first embodiment, the steering control device main unit 50 carries out the filtering processing by means of the filter containing the predetermined frequency characteristics representing the vehicle characteristics from the steering angle to the self-aligning torque $M_S$ of the steered wheels 6A and 6B, and sets the drive torque of the motor 4 based on the result of the filtering processing. This configuration promotes the obtainment of the control effects which a designer wants to obtain, thereby realizing more natural steering feeling.

Moreover, the predetermined frequency characteristics of the filter contain the characteristic of the twist torque of tire $M_{S2}$. The steering control device main unit 50 calculates the road surface reaction force torque $M_R$ so as to be in phase with the actual road surface reaction force torque, and this configuration can thus increase the calculation accuracy of the road surface reaction force torque $M_R$ than the conventional device.

In addition, the road surface reaction force torque $M_R$ can be accurately and artificially increased by correcting the drive torque of the motor 4 using the calculated road surface reaction force torque $M_R$ compared with the conventional device which does not consider the twist torque of tire $M_{S2}$. Particularly, even if the driver carries out relatively quick steering such as a quick lane change, natural steering feeling close to the manual steering can be realized without a sense of discomfort.

Further, the steering control device main unit 50 carries out filtering processing on the steering angle signal using a filter including a predetermined frequency characteristic representing the vehicle characteristic from the steering angle to the pneumatic-trail-caused torque $M_{S1}$, thereby correcting the drive torque of the motor 4 based on a filtered result. This configuration can attain natural steering feeling without a sense of discomfort, and enables easy optimization of delicate steering feeling.

If the steering feeling at a specific vehicle speed is to be improved, the vehicle models represented by the equations (1) to (13) only need to be designed so as to be limited to the specific vehicle speed. A calculation load and a memory capacity for calculation can be reduced in this case.

Second Embodiment

In the first embodiment, the road surface reaction force torque calculation module 52 calculates the reaction force command current by multiplying the road surface reaction force $M_R$ by the conversion gain $K_1$. In contrast, in a second embodiment, the road surface reaction force torque calculation module 52 calculates the reaction force command current $I_R$ by respectively multiplying the caster-trail-caused torque $M_F$ and the self-aligning torque $M_S$ by conversion gains $K_1$ and $K_2$, and obtaining a sum of the products.

The schematic configuration of the steering control device main unit 50 according to the second embodiment is the same as the steering control device main unit 50 according to the first embodiment. Parts of contents of processing by the road surface reaction force torque calculation module 52 and the reaction force command current calculation module 53 of the steering control device main unit 50 according to the second embodiment are different from those by the road surface reaction force torque calculation module 52 and the reaction force command current calculation module 53 according to the first embodiment. On this occasion, a description is mainly given of the difference from the first embodiment.

The road surface reaction force torque calculation module 52 according to the second embodiment takes in the vehicle speed signal and the steering angle signal. Moreover, the road surface reaction force toque calculation module 52 respectively calculates the caster-trail-caused torque $M_F$ and the self-aligning torque $M_S$ using the vehicle speed signal, the steering angle signal, and the vehicle models represented by the equations (1) to (13).

A conversion gain map for the conversion gains $K_1$ and $K_2$ as the predetermined gains are registered in advance to the steering control device main unit 50 according to the second embodiment as illustrated in FIG. 10 according to the first embodiment. The conversion gains $K_1$ and $K_2$ are values for respectively converting the caster-trail-caused torque $M_F$ and the self-aligning torque $M_S$ to the reaction force command current. Moreover, as illustrated in FIG. 10, values that vary depending on the vehicle speed are set to the conversion gains $K_1$ and $K_2$ as in the conversion gain $K_1$ according to the first embodiment.

The reaction force command current calculation module 53 sets the conversion gains $K_1$ and $K_2$ using the conversion gain map and the vehicle speed when the reaction force command current $I_R$ is calculated. Moreover, the reaction force command current calculation module 53 calculates the reaction force command current $I_R$ by respectively multiplying the caster-trail-caused torque $M_F$ and the self-aligning torque $M_S$ calculated by the road surface reaction force torque calculation module 52 by the conversion gains $K_1$ and $K_2$, and obtaining the sum of the products.

Specifically, a main object is to reduce the steering torque in the extremely low speed range of the vehicle speed including 0 km/h, the steering torque can be reduced by setting the reaction force command current to 0, resulting in steering feeling emphasizing the operability. The gradient of the steering torque with respect to the steering angle is originally small in a low speed range, and the steering feeling can be improved by setting large values to the conversion gains $K_1$ and $K_2$.

Moreover, the gradient of the steering torque with respect to the steering angle is originally large in a high speed range, and the gradient of the steering torque with respect to the steering angle can be increased in a proper range by setting the conversion gains $K_1$ and $K_2$ to values smaller than those in the low speed range, thereby providing proper operability while the reaction force feeling (so-called on-center feeling) is improved. The steering feeling can be improved across the entire vehicle speed range by changing $K_1$ and $K_2$ depending on the vehicle speed in this way. Note that, different values can respectively be set to the conversion gains $K_1$ and $K_2$.

Figure 15:
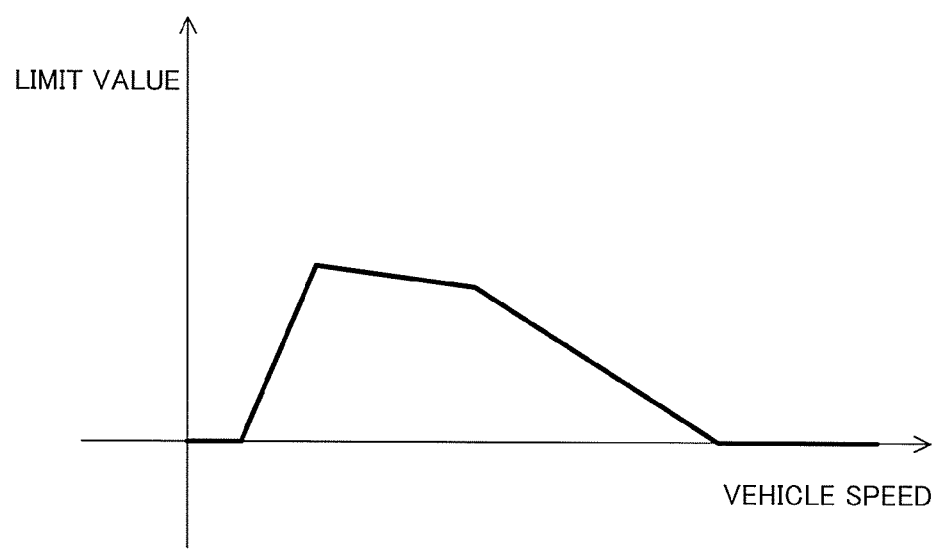
FIG. 15 A chart illustrating an example of a limit value setting map according to a second embodiment of the present invention.

Then, map values (limit value setting map) relating to limit values with respect to the vehicle speed are registered in advance to the steering control device main unit 50 as illustrated in FIG. 15. The reaction force command current calculation module 53 sets the limit value depending on the vehicle speed. Moreover, the reaction force command current calculation module 53 calculates the reaction force command current $I_R$, and then applies the limit so that the magnitude of the reaction force command current $I_R$ is within the set limit value.

It is possible to restrain an increase in steering torque caused by an increase in reaction force command current $I_R$ by limiting the magnitude of the reaction force command current $I_R$ in this way when the road surface reaction force torque is sufficiently generated at a large steering angle. Moreover, it is possible to set a proper limit value depending on the respective vehicle speeds by setting the limit value to values that vary depending on the vehicle speed. For example, an adjustment can be provided so that only the reaction force feeling can be improved if the steering wheel is close to the neutral point by setting a small value to the limit value in the high speed range.

A description is now given of a relationship between the pneumatic-trail-caused torque $M_{S1}$ and the twist torque of tire $M_{S2}$. The relationship between the pneumatic-trail-caused torque $M_{S1}$ and the twist torque of tire $M_{S2}$ is a relationship represented by the following equation (15) based on the equations (1) to (13). Moreover, a relationship between a front wheel sideslip angle $\beta_f$ and the twist torque of tire $M_{S2}$ represented by the following equation (16) is a relationship represented by the following equation (17). Note that, s denotes the Laplacian operator in the equations (15) and (17).

[Math. 8]

$$M_{S2} = k_z \frac{T_1 s}{T_1 s + 1} \frac{\left(\frac{K_f}{K_y V}\right) s + 1}{L_P K_f} M_{S1} \quad (15)$$

$$\beta_f = \beta + \frac{L_f \gamma}{V} - R_{sf} \phi - \delta \quad (16)$$

$$M_{S2} = -2 k_z \frac{T_1 s}{T_1 s + 1} \beta_f / G_s \quad (17)$$

According to the equation (15), for the twist torque of tire $M_{S2}$, a differential characteristic of the pneumatic-trail-caused torque $M_{S1}$ is generated. As a result, noise of the twist torque of tire $M_{S2}$ tends to increase compared with the pneumatic-trail-cause torque $M_{S1}$. Thus, the road surface reaction force torque calculation module 52 may apply low-pass filtering processing represented by the following equation (18), for example, to the twist torque $M_{S2}$. Note that, s denotes the Laplacian operator in the equation (18).

[Math. 9]

$$F(s) = \frac{1}{T_2 s + 1} \quad (18)$$

On this occasion, a time constant $T_2$ of the low-pass filter is set in advance to a value which is equal to or more than 5 Hz, which is a limit for human steering frequency, and is also equal to or more than a frequency band affecting the steering feeling. The upper limit is set in advance to a Nyquist frequency for the calculation period of the road surface reaction force torque 52. As a result, noise equal to or more than the steering frequency generated on the twist torque of tire $M_{S2}$ can be reduced, thereby restraining a decrease in steering feeling caused by the noise.

Figure 16:
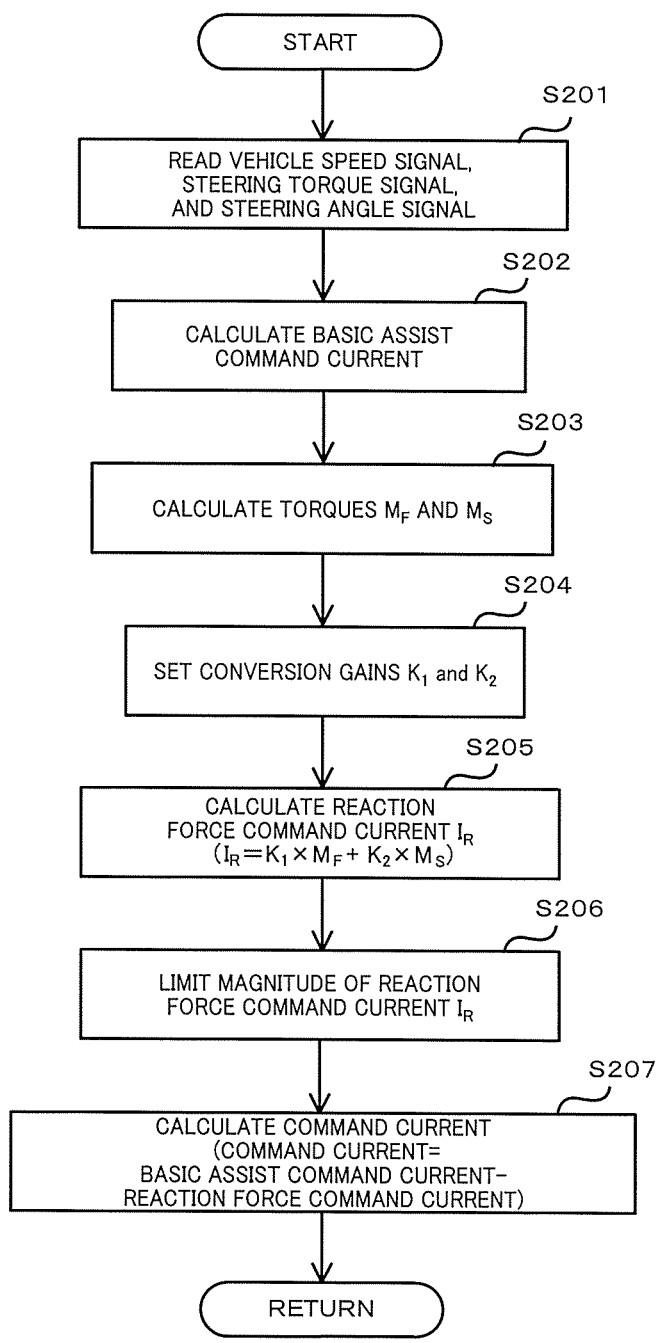
FIG. 16 A flowchart illustrating an operation of the command current calculation system according to the second embodiment of the present invention.

A description is now given of the operation. FIG. 16 is a flowchart illustrating the operation of the command current calculation system 60 according to the second embodiment of the present invention. Referring to FIG. 16, the command current calculation system 60 reads the stored vehicle speed, steering torque, and steering angle (Step S201). Then, the command current calculation system 60 calculates the basic assist command current using the assist map and the read vehicle speed and steering torque (Step S202).

Moreover, the command current calculation system 60 calculates the caster-trail-caused torque $M_F$ and the self-aligning torque $M_S$ using the read vehicle speed and steering angle, and the vehicle models represented by the equations (1) to (13) (Step S203). Then, the command current calculation system 60 sets the conversion gains $K_1$ and $K_2$ using the conversion gain map (see FIG. 10) set in advance and the vehicle speed (Step S204).

Then, as represented by the following equation (19), the command current calculation system 60 calculates the reaction force command current $I_R$ by obtaining the sum of the caster-trail-caused torque $M_F$ multiplied by the conversion gain $K_1$ and the self-aligning torque $M_S$ multiplied by the conversion gain $K_2$ (Step S205).

[Math. 10]

$$I_R = K_1 M_F + K_2 M_S \quad (19)$$

Then, the command current calculation system 60 limits the calculated reaction force command current $I_R$ within the limit value (Step S206). Then, the command current calculation system 60 calculates the command current by subtracting the reaction force command current $I_R$ from the basic assist command current (Step S207). Information on the calculated command current is transmitted to the current control module 55, and the current control module 55 performs the control to cause a current, the magnitude of which is set based on the command current, to flow through the motor 4. Then, the command current calculation system 60 repeats the processing in Steps S201 to S206.

A description is now given of a control effect by the steering control device main unit 50 according to the second embodiment. FIG. 17 are explanatory diagrams illustrating the steering control device main unit 50 according to second embodiment of the present invention. A Lissajous waveform of FIG. 17(a) represents a result of a sinusoidal wave steering at 0.2 Hz at 40 km/h when the motor 4 is driven by the command current obtained by subtracting the reaction force command current proportional to the self-aligning torque $M_S$ from the basic assist command current.

Figure 17A:
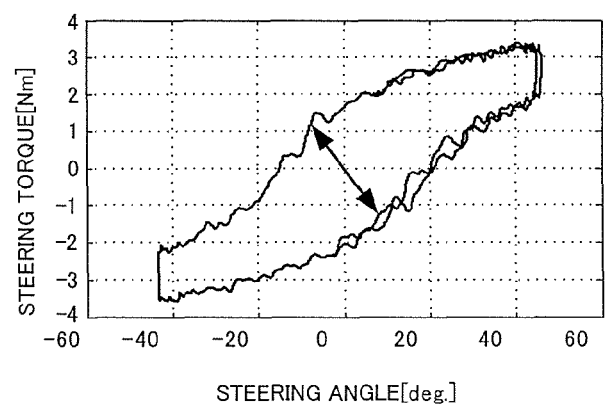
FIG. 17 Explanatory diagrams illustrating an effect of the steering control device main unit according to the second embodiment of the present invention.

From FIG. 17(a), it is found that the gradient of the steering torque with respect to the steering angle in a neighborhood of the origin increases to the same level as that of FIG. 13(b), and the reaction force feeling is improved. Moreover, the hysteresis width of the Lissajous waveform of FIG. 17(a) is narrower than that of the Lissajous waveform of FIG. 13(a), and also is wider than that of the Lissajous waveform of FIG. 13(b). From these facts, it is found that the proper friction feeling is provided, and more natural steering feeling is provided.

Figure 17B:
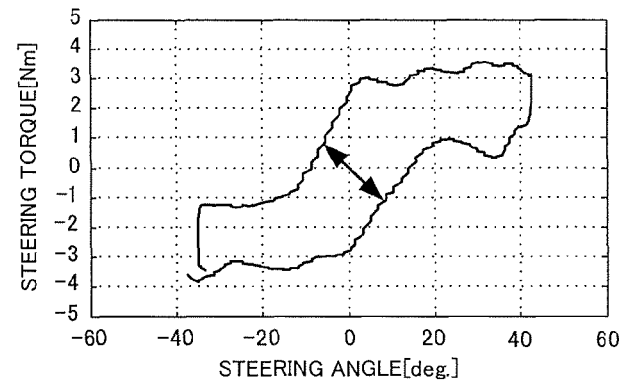

Further, a Lissajous waveform of FIG. 17(b) represents a result of a sinusoidal wave steering at 2 Hz when the motor 4 is driven by the command current obtained by subtracting the reaction force command current proportional to the self-aligning torque $M_S$ from the basic assist command current. From FIG. 17(b), it is found that the change rate of the steering torque with respect to the steering angle in a neighborhood of 0 degrees increases, and more proper steering reaction force feeling is thus realized. Moreover, it is found that the steering torque after the change in steering direction is not close to 0, and a smooth Lissajous waveform is brought about. Further, it is found that a proper hysteresis width is provided, resulting in a reduction in the friction feeling.

As illustrated in FIG. 11 according to the first embodiment described above, the gain of the self-aligning torque $M_S$ is larger than that of the caster-trail-caused torque $M_F$, and the self-aligning torque $M_S$ occupies a larger ratio in the road surface reaction force torque $M_R$. Therefore, even if the reaction force command current $I_R$ is calculated based on the self-aligning torque $M_S$, a Lissajous waveform equivalent to a result of the calculation of the reaction force command current $I_R$ based on the road surface reaction force torque $M_R$ can be obtained, and an effect similar to that of the first embodiment can be obtained.

According to the second embodiment as described above, it is possible to calculate a road surface reaction force torque $M_R$ closer to an actual value than the conventional electric power steering device, and to impart the current to the motor 4 based on the calculated self-aligning torque $M_S$. As a result, the steering characteristic of the manual steering which a control designer tries to obtain can be emphasized. Moreover, natural steering feeling without a sense of discomfort can be realized from the low-frequency steering range to the high-frequency steering range.

Further, the command current calculation system 60 calculates the reaction force command current $I_R$ by obtaining the sum of the caster-trail-caused torque $M_F$ multiplied by the conversion gain $K_1$ and the self-aligning torque $M_S$ multiplied by the conversion gain $K_2$. This configuration can adjust the ratio between the caster-trail-caused torque $M_F$ and the self-aligning torque $M_S$ occupying the road surface reaction force torque to be artificially increased. In other words, the gradient of the steering torque with respect to the steering angle (steering reaction force feeling) and the hysteresis width (friction feeling) in a neighborhood of the origin in the Lissajous waveform can be independently adjusted.

On this occasion, according to the first embodiment, natural steering feeling close to the manual steering without a sense of discomfort is realized by the reaction force command current based on the road surface reaction force torque $M_R$. However, there is a case where the feeling needs to be finely adjusted depending on preferences of a driver such as a case where the hysteresis width of the Lissajous waveform is slightly reduced to adjust the friction feeling while the steering reaction force feeling is maintained as emphasized for high-frequency steering, for example.

The hysteresis width of the Lissajous waveform can be slightly reduced by setting $K_1$ larger than $K_2$ in this case. As a result, delicate steering feeling can be easily optimized while natural steering feeling without a sense of discomfort close to the manual steering is realized.

Moreover, if the conversion gain $K_1$ is set to 0, adjustment of only increasing the reaction force feeling by the self-aligning torque $M_S$ can be provided. As a result, the manual steering feeling on which self-aligning torque $M_S$ acts can be emphasized.

According to the second embodiment, the reaction force command current calculation module 53 obtains the reaction force command current $I_R$ by respectively multiplying the torque $M_F$ and $M_S$ by the conversion gains $K_1$ and $K_2$ as represented by the equation (19). However, how to obtain the reaction force command current $I_R$ is not limited to this example, and the reaction force command current $I_R$ may be registered in advance to the command current calculation system 60 as a map value with respect to the caster-trail-caused torque $M_F$, the self-aligning torque $M_S$, or the road surface reaction force torque $M_R$, and the vehicle speed.

Third Embodiment

According to the first and second embodiments, the assist command current calculation module 51 calculates the basic assist command current based on the vehicle speed and the steering torque. In contrast, according to a third embodiment, the steering torque sensor 11 according to the first embodiment is omitted, and the assist command current calculation module 51 calculates the basic assist command current based on the road surface reaction force torque $M_R$ calculated by the road surface reaction force torque calculation module 52, and the vehicle speed.

Figure 18:
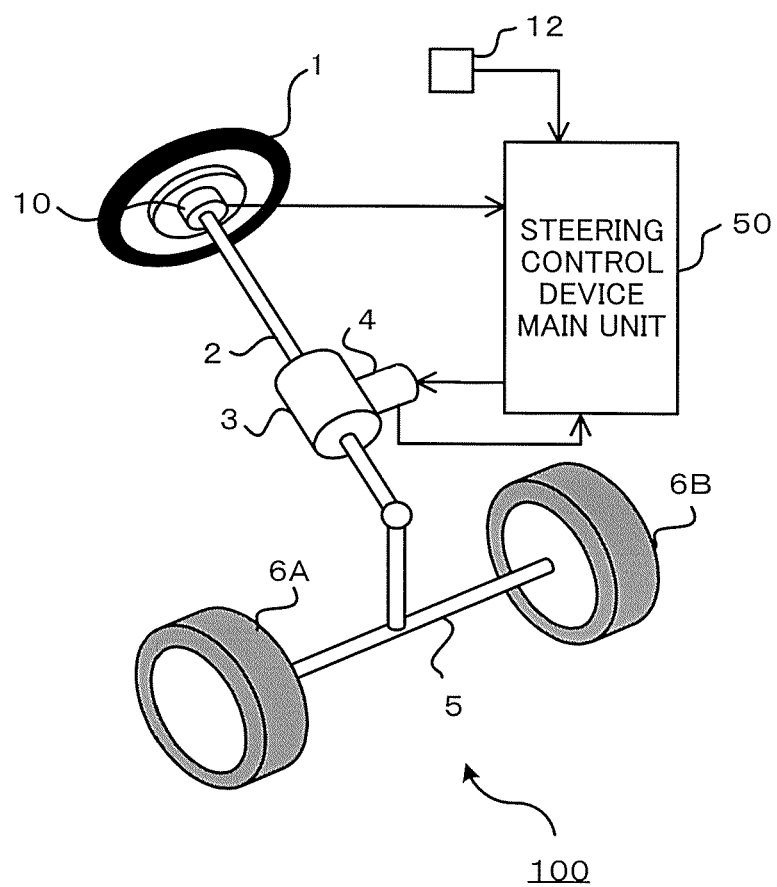
FIG. 18 A configuration diagram illustrating an electric power steering device according to a third embodiment of the present invention.

FIG. 18 is a configuration diagram illustrating an electric power steering device according to the third embodiment of the present invention. In FIG. 18, the overview of the configuration of the electric power steering device 100 according to the third embodiment is the same as the configuration of the electric power steering device 100 according to the first embodiment. Moreover, the configuration of the electric power steering device 100 according to the third embodiment is different from the electric power steering device 100 according to the first embodiment in that the steering torque sensor 11 according to the first embodiment is omitted.

Figure 19:
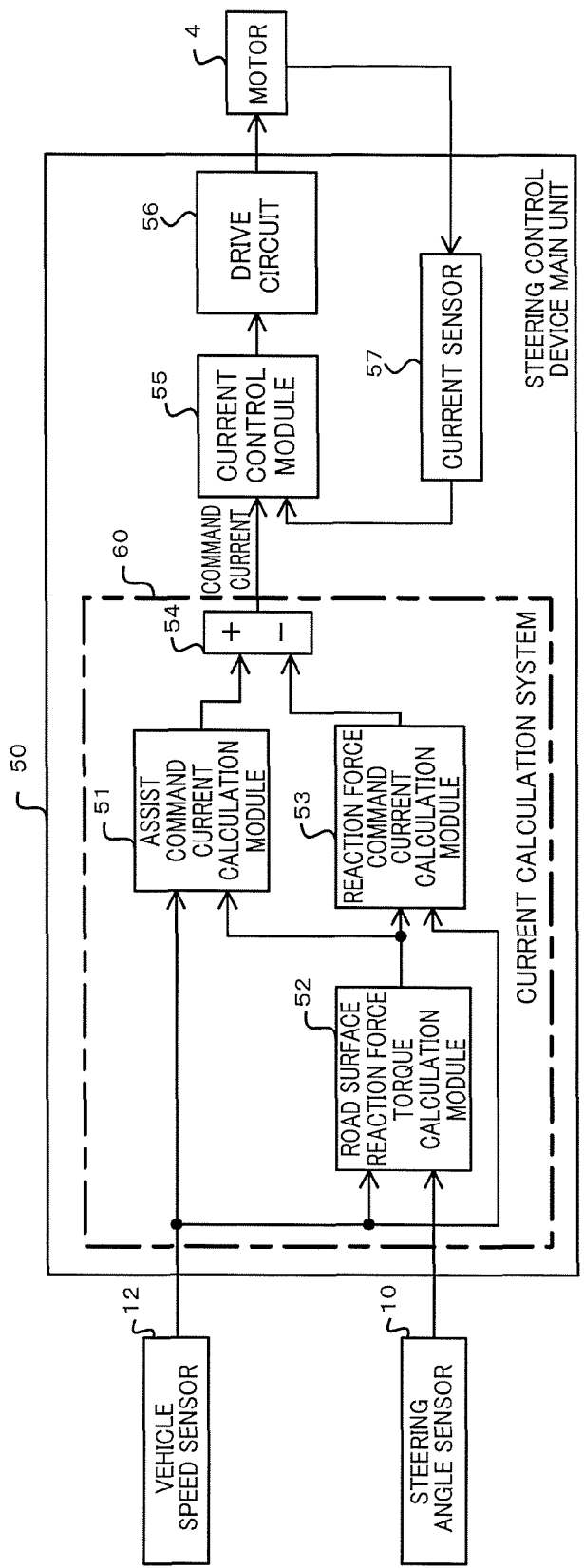
FIG. 19 A block diagram illustrating the steering control device main unit of FIG. 18.

FIG. 19 is a block diagram illustrating the steering control device main unit 50 of FIG. 18. In FIG. 19, the schematic configuration of the steering control device main unit 50 according to the third embodiment is the same as the steering control device main unit 50 according to the first embodiment. Moreover, the steering control device main unit 50 according to the third embodiment is different from the steering control device main module 50 in that the assist command current calculation module 51 receives the calculation result of the road surface reaction force torque from the road surface reaction force torque calculation module 52 in place of the steering torque signal from the steering torque sensor 11.

The assist command current calculation module 51 calculates the basic assist command current based on the road surface reaction force torque $M_R$ calculated by the road surface reaction force torque calculation module 52 and the vehicle speed. On this occasion, values of the basic assist command current with respect to the vehicle speed and the road surface reaction force torque, for example, are stored as an assist map in the steering control device main unit 50 according to the third embodiment. The assist command current calculation module 51 calculates a basic assist command current corresponding to the vehicle speed and the road surface reaction force torque by using the assist map. The other configuration and operation are the same as those in the first embodiment.

As described above, according to the third embodiment, the twist torque of tire $M_{S2}$ is included in the road surface reaction force torque $M_R$ acting on the steering shaft 2. Therefore, even the configuration without the steering torque sensor 11 can carry out proper assist control for a change in the steering torque generated by the twist of the tires themselves.

If the third embodiment is applied to a vehicle small in caster trail, pneumatic trail, or cornering power, the assist command current calculation module 51 may be omitted. In this case, the reaction force command current calculated by the reaction force command current calculation module 53 may be used as the command current of the motor 4. As a result, the manual steering feeling can be maintained, and the steering reaction force torque can be increased.

Moreover, the present invention can be applied to a steering device employing a system such as a steer-by-wire system in which a steering wheel and steered wheels are not mechanically coupled, and the road surface reaction force torque is not transmitted to the steering wheel. In this case, the reaction force command current calculated by the reaction force command current calculation module 53 may be used as the command current of the motor attached to a steering wheel side. As a result, the steering reaction force torque closer to the actual road surface reaction force torque than that in the conventional device can be imparted to a driver, and the manual steering feeling can be reproduced. As a result, the steering feeling can be increased even in a steering device employing the steer-by-wire system.

Fourth Embodiment

According to the first embodiment, the reaction force command current calculation module 53 calculates the reaction force command current $I_R$ using the road surface reaction force torque $M_R$ and the vehicle speed. In contrast, according to a fourth embodiment, the reaction force command current calculation module 53 calculates the reaction force command current $I_R$ using the road surface reaction force torque $M_R$ and the vehicle speed, and corrects the reaction force command current $I_R$ using the steering torque.

Figure 20:
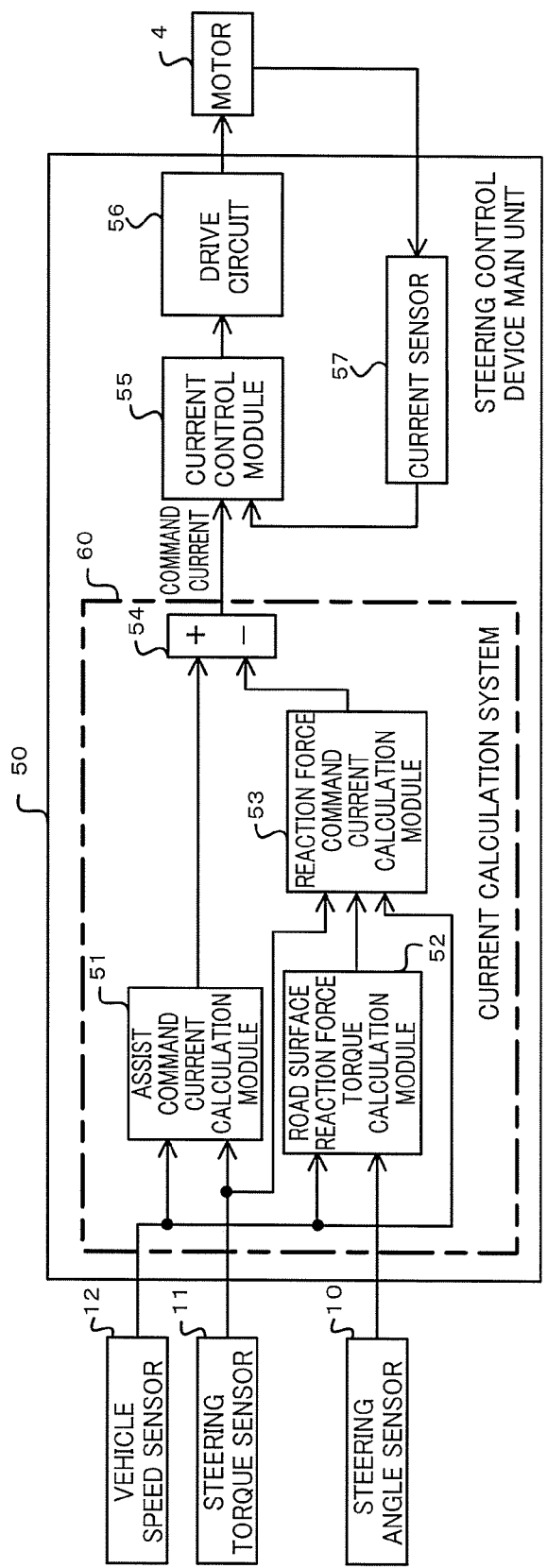
FIG. 20 A block diagram illustrating a steering control device main unit according to a fourth embodiment of the present invention.
Figure 21:
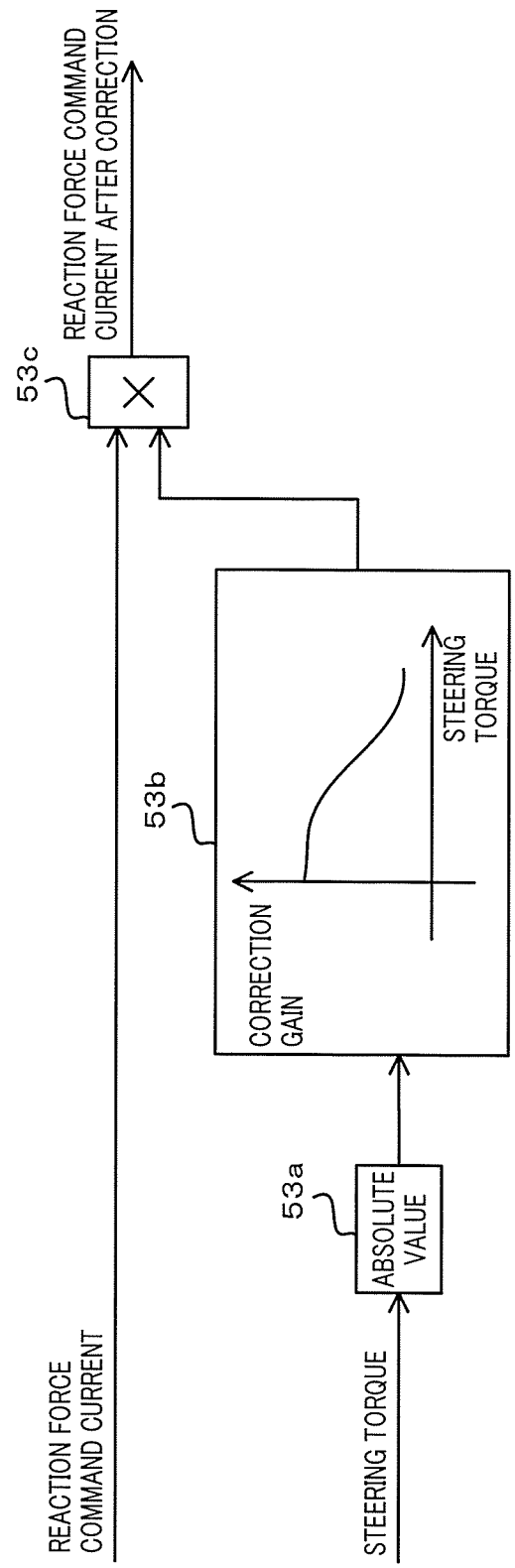
FIG. 21 An explanatory diagram for describing correction processing for a reaction force command current by a reaction force command current calculation module of FIG. 20.

Moreover, according to the forth embodiment, a part of the internal processing of the reaction force command current calculation module 53 is different from that of the reaction force command current calculation module 53 according to the first and second embodiments, and a description is mainly given of the difference from the first and second embodiments. FIG. 20 is a block diagram illustrating the steering control device main unit 50 according to the fourth embodiment of the present invention. FIG. 21 is an explanatory diagram for describing the correction processing for the reaction force command current by the reaction force command current calculation module 53 of FIG. 20.

In FIGS. 20 and 21, the reaction force current calculation module 53 according to the fourth embodiment calculates the reaction force command current $I_R$ as in the first and second embodiments. Moreover, the reaction force command current calculation module 53 includes an absolute value calculation module 53a, a correction gain setting module 53b, and a multiplication module 53c. The absolute value calculation module 53a receives the steering torque signal from the steering torque sensor 11, and calculates the absolute value of the steering torque.

A correction gain map which includes map values of the correction gain to the steering torque is registered in advance to the correction gain setting module 53b. The correction gain map is registered so as to reduce the correction gain with respect to an increase in steering torque. The correction gain setting module 53b sets the correction gain corresponding to the absolute value of the steering torque calculated by the absolute value calculation module 53a based on the correction gain map. The multiplication module 53c corrects the reaction force command current $I_R$ calculated by the reaction force command current calculation module 53 as in the first and second embodiments by multiplying the reaction force command current $I_R$ by the correction gain set by the steering torque. The other configuration and operation are the same as those in the first and second embodiments.

As described above, according to the fourth embodiment, the correction gain map is registered so as to reduce the correction gain with respect to the increase in steering torque. As a result, the reaction force command current can be reduced to restrain the steering torque from increasing in a region where the steering torque is sufficiently large, and imparting the road surface reaction force torque is not necessary. Moreover, if the road surface friction coefficient is small, and hence the steering torque is small, the correction gain does not decrease, and the imparted road surface reaction force torque can be maintained.

According to the fourth embodiment, the correction gain is registered to the correction gain setting module 53b while the correction gain is associated with the steering torque. However, how the registration of the correction gain is registered is not limited to this example, and the reaction force command current calculation module 53 can calculate the steering speed from the steering angle signal, and a correction gain based on the steering speed may be registered in advance to the correction gain setting module 53b. In this case, if a setting in which the correction gain decreases as the steering speed increases is provided, for example, in a state in which a driver has to steer over a large steering angle in a short period, though the reaction force command current is reduced, resulting in a decrease in reaction force feeling, the steering can be carried out using a small steering torque.

Moreover, the correction gain corresponding to the steering angle may be registered in advance to the correction gain setting module 53b. In this case, a difference in road surface reaction force torque characteristic between the left and right directions, which the vehicle originally has, can be restrained by setting the correction gain to different values respectively for the steering in the left and right directions. Moreover, the left/right steering directions can be determined based on the sign (+/−) of the steering torque, and different correction gains can be set depending on the sign of the steering torque.

Fifth Embodiment

According to a fifth embodiment, the road surface reaction force torque calculation module 52 corrects the vehicle models represented by the equations (1) to (13) based on the vehicle weight or the road surface friction coefficient.

The schematic configuration of the steering control device main unit 50 according to the fifth embodiment is the same as the schematic configuration of the steering control device main unit 50 according to the first embodiment. Moreover, the steering control device main unit 50 according to the fifth embodiment is different from the steering control device main unit 50 according to the first embodiment in that a vehicle weight sensor 13 and a road surface friction coefficient sensor 14 are connected, and in internal processing of the road surface reaction force torque calculation module 52. On this occasion, a description is mainly given of the difference from the first embodiment.

Figure 22:
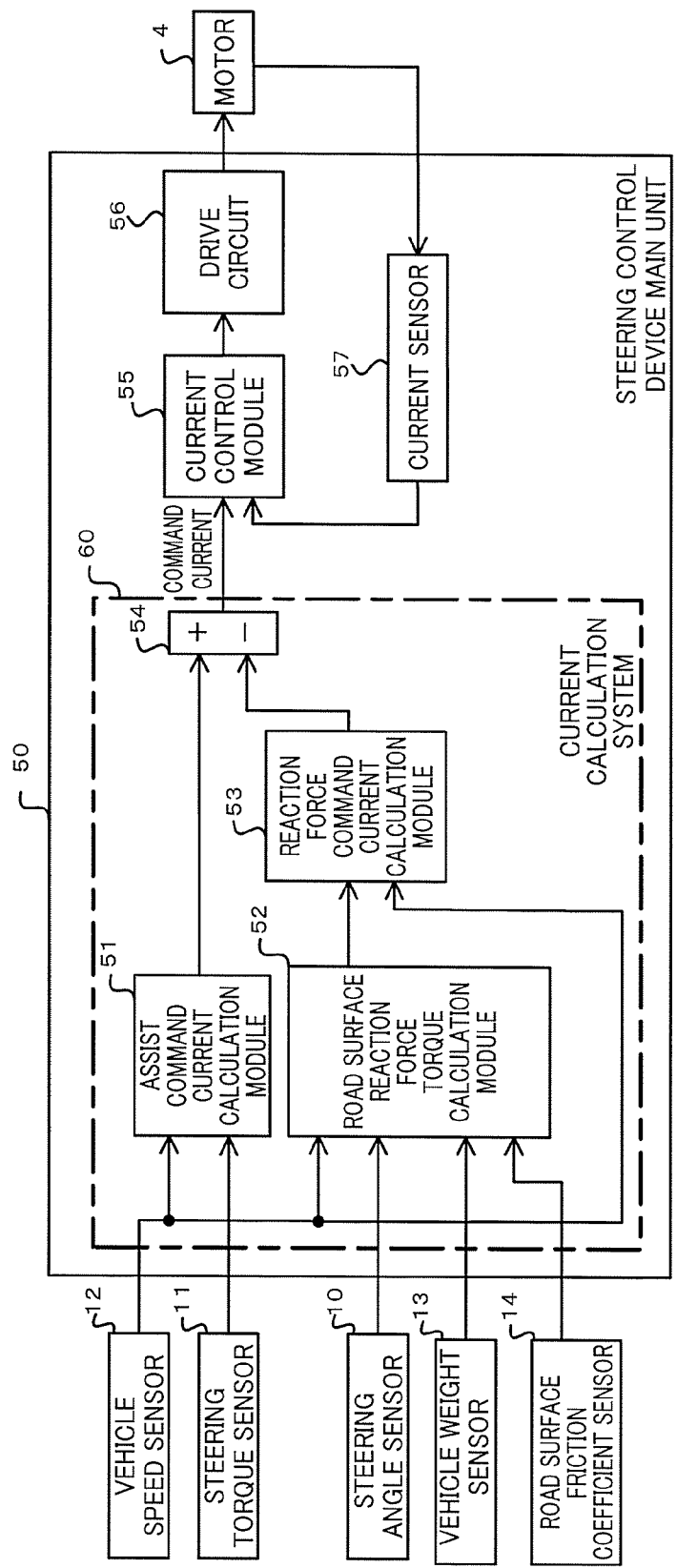
FIG. 22 A block diagram illustrating a steering control device main unit according to a fifth embodiment of the present invention.

FIG. 22 is a block diagram illustrating the steering control device main unit 50 according to the fifth embodiment of the present invention. In FIG. 22, the vehicle weight sensor 13 serving as vehicle weight acquisition means detects or estimates a vehicle weight m, and generates a vehicle weight signal based on the vehicle weight m. The road surface friction coefficient sensor 14 serving as road surface friction coefficient acquisition means detects or estimates a road surface friction coefficient or a physical quantity corresponding thereto, thereby generating a road surface friction coefficient signal.

On this occasion, the arithmetic expressions of the vehicle models represented by the equations (1) to (13) contain the vehicle weight m as a parameter (variable). As a result, the road surface reaction force calculation module 52 monitors a change in the vehicle weight m using the vehicle weight signal from the vehicle weight sensor 13, and changes the characteristics of the vehicle models based on the vehicle weight m. Moreover, the change in the vehicle weight m mainly includes changes caused by weights of passengers, loads, and fuel, and a sprung mass $m_s$ of the vehicle models represented by the equations (1) to (13) may be changed based on the vehicle weight m. In other words, the vehicle weight m and the sprung mass $m_s$, which are considered as fixed values according to the first embodiment, are considered as variables according to the fifth embodiment.

Moreover, cornering powers $K_f$ and $K_r$ of the front and rear wheels change depending on the vehicle weight and the road surface friction coefficient. Therefore, the road surface reaction force calculation module 52 changes the cornering powers $K_f$ and $K_r$ of the vehicle models based on the vehicle weight and the road surface friction coefficient. For example, the cornering powers $K_f$ and $K_r$ of the vehicle models may be set to increase in response to an increase in vehicle weight, for example. Further, the cornering powers $K_f$ and $K_r$ of the vehicle models may be set to decrease on a road surface which is low in road surface friction coefficient, and is thus slippery.

According to the fifth embodiment, as described above, the road surface reaction force torque $M_R$ closer to the actual road surface reaction force torque, which ranges from the steering angle to the self-aligning torque $M_S$, can be calculated considering also the case where the vehicle weight largely changes and the case where the vehicle travels on a slippery surface. As a result, the road surface reaction force torque $M_R$ considering changes in the vehicle weight and the road surface can be artificially increased, resulting in more natural steering feeling.

Note that, according to the fifth embodiment, the cornering powers $K_f$ and $K_r$ of the vehicle models are changed based on both the vehicle weight and the road surface friction coefficient. However, what is used to change the cornering powers $K_f$ and $K_r$ is not limited to this example, the cornering powers $K_f$ and $K_r$ of the vehicle models may be changed based on only any one of the vehicle weight and the road surface friction coefficient.

Moreover, regarding the filter containing the vehicle models, the filter may be set to change depending on at least one of the vehicle speed of the vehicle, the steering torque, the steering angle, the vehicle weight, the road surface friction coefficient, the steering speed, and the steering direction. As a result, natural steering feeling without a sense of discomfort can be realized based on the vehicle speed and the steering conditions.

Further, according to the first to fifth embodiments, the vehicle models represented by the equations (1) to (13) are used for calculating the self-aligning torque $M_S$. However, what is used to calculate the self-aligning torque $M_S$ is not limited to this example. For example, a vehicle model registered in advance may be identified based on the measured steering angle and the measured self-aligning torque without using the vehicle models represented by the equations (1) to (13), and the reaction force command current may be calculated using the identified vehicle model. Also in that case, the same effects as those of the first to fifth embodiments may be obtained.

Moreover, according to the first to fifth embodiments, the steering control device main unit 50 monitors the change in the steering angle via the steering angle sensor 10. On this occasion, the rotation angle of the motor 4 and the rotation angles (steered angles) of the steered wheels 6A and 6B are physical quantities changing in response to the steering angle. Thus, the steering control device main module 50 may monitor a change in the steering angle by monitoring changes in these physical quantities not via the steering angle sensor 10 (but via other sensors).

Further, according to the first to fifth embodiments, the assist torque generated by the motor 4 is calculated based on the reaction force command current and the basic assist command current. However, how to calculate the assist torque is not limited to this example, and the assist torque according to the first to fifth embodiments may be replaced by various motor-generated torques based on the self-aligning torque $M_S$ or the road surface reaction force torque $M_R$ calculated using the vehicle models represented by the equations (1) to (13).

The invention claimed is:

1. A steering control device for controlling drive of a motor for imparting a power to a steering system of a vehicle, the steering control device comprising a steering control device main unit for calculating a self-aligning torque from a steering angle signal received from a steering angle detector for generating a steering angle signal corresponding to a steering angle of the steering system, by using a vehicle model containing a predetermined frequency characteristic representing a rotational rate of a steered wheel of the steering system from the steering angle to the self-aligning torque, and setting a drive torque of the motor based on a result obtained by multiplying the calculated self-aligning torque by a predetermined gain which varies based on a speed of the vehicle.

2. A steering control device according to claim 1, wherein the vehicle model includes a characteristic of a twist torque of a tire of the steered wheel, the twist torque being a torque which is generated by the tire itself twisted by an elastic deformation and acts on the steering system.

3. A steering control device according to claim 2, wherein the steering control device main unit calculates a caster-trail-caused torque from the steering angle signal by using a caster-trail-caused torque calculation model containing a predetermined frequency characteristic representing a vehicle characteristic from the steering angle to the caster-trail-caused torque, the caster-trail-caused torque being a torque which is generated by a caster trail and a tire lateral force and acts on the steering system, and corrects the drive torque based on the calculated caster-trail-caused torque.

4. A steering control device according to claim 3, wherein the steering control device main unit corrects the drive torque based on results obtained by multiplying the calculated self-aligning torque and the caster-trail-caused torque by the predetermined gain, respectively.

5. A steering control device according to claim 2, wherein the steering control device main unit is configured to:
   calculate a basic assist torque based on a steering torque signal from a steering torque detector for generating the steering torque signal corresponding to a steering torque applied to the steering system by a driver; and
   correct the drive torque using the calculated basic assist torque.

6. A steering control device according to claim 2, wherein the steering control device main unit corrects the set drive torque depending on a change in at least any one of:
   the speed of the vehicle;
   a steering torque detected by a steering torque detector for detecting a steering torque applied to the steering system by a driver;
   the steering angle detected by the steering angle detector;
   a vehicle weight obtained by vehicle weight acquisition circuitry for detecting or estimating a vehicle weight;
   a road surface friction coefficient obtained by road surface friction coefficient acquisition circuitry for detecting or estimating a road surface friction coefficient;
   a steering speed based on the steering angle; and
   a steering direction based on any one of the steering angle and the steering torque.

7. A steering control device according to claim 2, wherein the vehicle model changes depending on a change in at least any one of:
   the speed of the vehicle;
   a vehicle weight acquired by a vehicle weight acquisition circuitry which detects or estimates the vehicle weight; and
   a road surface friction coefficient acquired by road surface friction coefficient acquisition circuitry which detects or estimates the road surface friction coefficient.

8. A steering control device according to claim 1, wherein the steering control device main unit calculates a caster-trail-caused torque from the steering angle signal by using a caster-trail-caused torque calculation model containing a predetermined frequency characteristic representing a vehicle characteristic from the steering angle to the caster-trail-caused torque, the caster-trail-caused torque being a torque which is generated by a caster trail and a tire lateral force and acts on the steering system, and corrects the drive torque based on the calculated caster-trail-caused torque.

9. A steering control device according to claim 8, wherein the steering control device main unit
   corrects the drive torque based on results obtained by multiplying the calculated self-aligning torque and the caster-trail-caused torque by the predetermined gain, respectively.

10. A steering control device according to claim 1, wherein the steering control device main unit is configured to:
   calculate a basic assist torque based on a steering torque signal from a steering torque detector for generating the steering torque signal corresponding to a steering torque applied to the steering system by a driver; and
   correct the drive torque using the calculated basic assist torque.

11. A steering control device according to claim 1, wherein the steering control device main unit corrects the set drive torque depending on a change in at least any one of:
   the speed of the vehicle;
   a steering torque detected by a steering torque detector for detecting a steering torque applied to the steering system by a driver;
   the steering angle detected by the steering angle detector;
   a vehicle weight obtained by vehicle weight acquisition circuitry for detecting or estimating a vehicle weight;
   a road surface friction coefficient obtained by road surface friction coefficient acquisition circuitry for detecting or estimating a road surface friction coefficient;
   a steering speed based on the steering angle; and
   a steering direction based on any one of the steering angle and the steering torque.

12. A steering control device according to claim 1, wherein the vehicle model changes depending on a change in at least any one of:
   the speed of the vehicle;
   a vehicle weight acquired by a vehicle weight acquisition circuitry which detects or estimates a vehicle weight; and
   a road surface friction coefficient acquired by road surface friction coefficient acquisition circuitry which detects or estimates a road surface friction coefficient.

* * * * *